US012739553B2

(12) United States Patent
Carlson et al.

(10) Patent No.: US 12,739,553 B2
(45) **Date of Patent: *Sep. 15, 2026**

(54) SYSTEM FOR CHARGING AN EAR-WORN ELECTRONIC DEVICE

(71) Applicant: Starkey Laboratories, Inc., Eden Prairie, MN (US)

(72) Inventors: Erik Carlson, Stillwater, MN (US); Thomas Burns, Minneapolis, MN (US); Kyle Olson, St. Louis Park, MN (US); Kent Giswold, Minnetonka, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 19/303,720

(22) Filed: Aug. 19, 2025

(65) Prior Publication Data

US 2026/0089424 A1 Mar. 26, 2026

Related U.S. Application Data

(63) Continuation of application No. 18/924,062, filed on Oct. 23, 2024, which is a continuation of application (Continued)

(51) Int. Cl.

| | |
|---|---|
| ***H04R 1/1025*** | (2026.01) |
| ***H01M 10/46*** | (2006.01) |
| ***H04R 25/00*** | (2006.01) |

(52) U.S. Cl.

CPC .......... *H04R 1/1025* (2013.01); *H01M 10/46* (2013.01); *H04R 25/602* (2013.01); *H04R 2225/31* (2013.01); *H04R 2225/57* (2019.05)

(58) Field of Classification Search

CPC .......................... H04R 1/1025; H04R 25/602; H04R 2225/31; H04R 2225/57

(Continued)

(56) References Cited

U.S. PATENT DOCUMENTS

| | | | |
|---|---|---|---|
| 5,253,300 | A | 10/1993 | Knapp |
| D397,796 | S | 9/1998 | Yabe |

(Continued)

FOREIGN PATENT DOCUMENTS

| | | | |
|---|---|---|---|
| EP | 2640170 | A1 | 9/2013 |
| WO | WO 2016/036309 | A1 | 3/2016 |

(Continued)

OTHER PUBLICATIONS

European Patent Application No. 20 750 976.1, filed Jul. 14, 2020; European Office Action issued Oct. 27, 2023, 8 pages.

(Continued)

*Primary Examiner* — George C Monikang
(74) *Attorney, Agent, or Firm* — Mueting Raasch Group

(57) ABSTRACT

A system includes a hearing device comprising a rechargeable power source, power management circuitry, and a first charging interface comprising a first cathode contact and a first anode contact spaced apart from the first cathode contact. A charging module comprises a second charging interface configured to detachably couple with the first charging interface of the hearing device. The second charging interface comprises a second anode contact having a contact surface and a displaceable second cathode contact. An arrangement is configured to displace at least a portion of the second cathode contact above the contact surface to facilitate electrical contact between the first and second cathode contacts prior to electrical contact between the first and second anode contacts. Charging circuitry of the charging module is coupled to the second charging interface and (Continued)

configured to charge the rechargeable power source of the hearing device.

21 Claims, 15 Drawing Sheets

Related U.S. Application Data

No. 18/810,014, filed on Aug. 20, 2024, which is a continuation of application No. 17/553,716, filed on Dec. 16, 2021, now Pat. No. 12,101,588, which is a continuation of application No. PCT/US2020/041956, filed on Jul. 14, 2020.

(60) Provisional application No. 62/876,454, filed on Jul. 19, 2019, provisional application No. 62/943,375, filed on Dec. 4, 2019.

(58) Field of Classification Search
USPC ......................... 381/312, 314, 322, 324, 328
See application file for complete search history.

(56) References Cited

U.S. PATENT DOCUMENTS

| | | | | |
|---|---|---|---|---|
| D554,756 | S | 11/2007 | Sjursen | |
| D611,606 | S | 3/2010 | Vaterlaus | |
| 8,213,651 | B2 | 7/2012 | Schmidt | |
| D728,107 | S | 4/2015 | Torres Martin | |
| D857,650 | S | 8/2019 | Hardi | |
| D895,806 | S | 9/2020 | Zheng | |
| D896,969 | S | 9/2020 | Yu | |
| 10,798,500 | B1 | 10/2020 | Shi | |
| D924,207 | S | 7/2021 | Li | |
| D941,475 | S | 1/2022 | Burns | |
| 2008/0118093 | A1 | 5/2008 | Klemenz | |
| 2008/0240480 | A1* | 10/2008 | Pinnell | H04R 25/602 381/323 |
| 2009/0067652 | A1 | 3/2009 | Schmidt | |
| 2016/0353216 | A1 | 12/2016 | Ruzicka | |
| 2017/0195466 | A1 | 7/2017 | Chen | |
| 2018/0370522 | A1 | 12/2018 | Collins | |

FOREIGN PATENT DOCUMENTS

| | | |
|---|---|---|
| WO | WO 2016/126476 A1 | 8/2016 |
| WO | WO 2017/058675 | 4/2017 |
| WO | WO 2019/037854 A1 | 2/2019 |

OTHER PUBLICATIONS

International Search Report and Written Opinion from PCT Application No. PCT/US2020/041956 dated Nov. 2, 2020, 10 pages.

Extended European Search Report for Application No. 252121223 dated Feb. 4, 2026 (8 pages).

* cited by examiner

*Figure 8C*
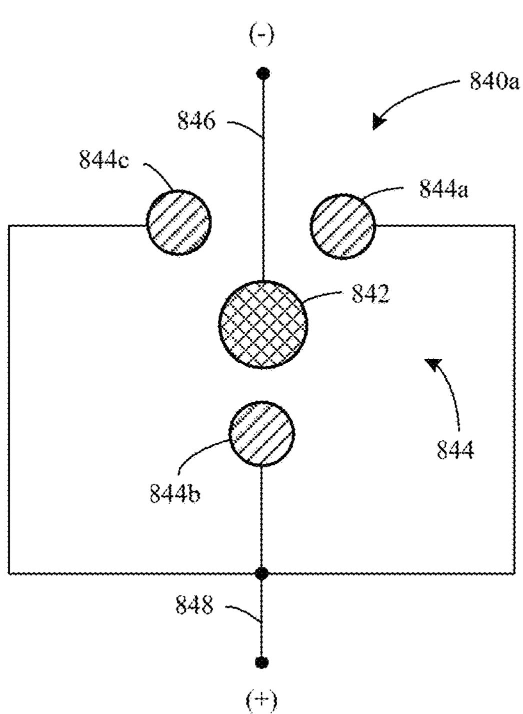
*Figure 8D*
(-)
840b
846
844c
844a
842
852
850
844b
844
848
($S_1$)
(+)
($S_2$)
*Figure 8E*
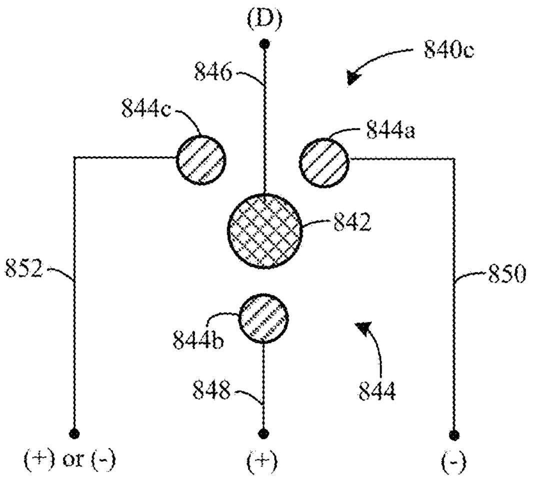

864
860
844a
844c
844b
862
840d

842

866

840a

*Figure 9*
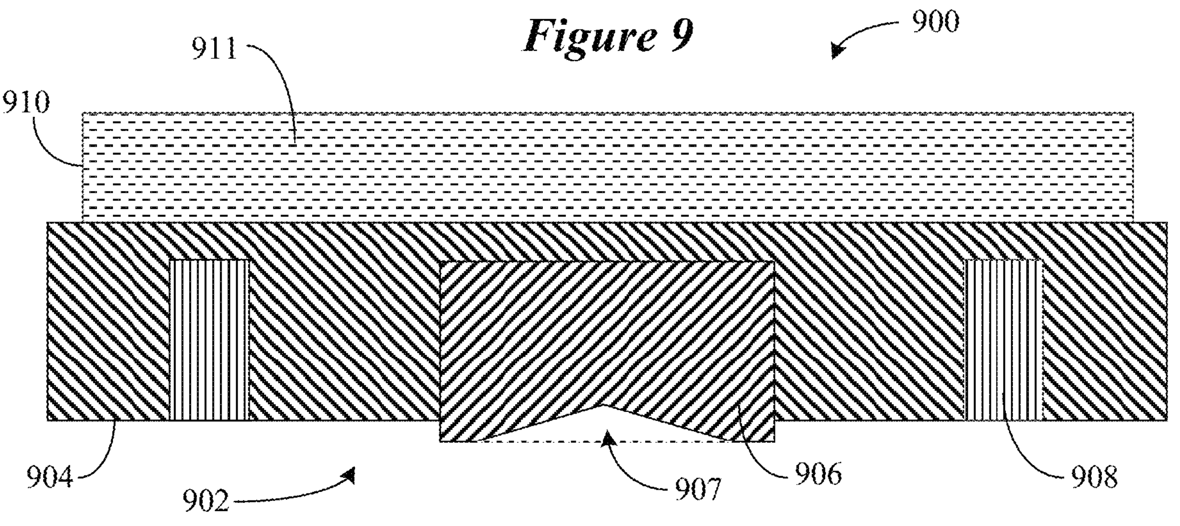
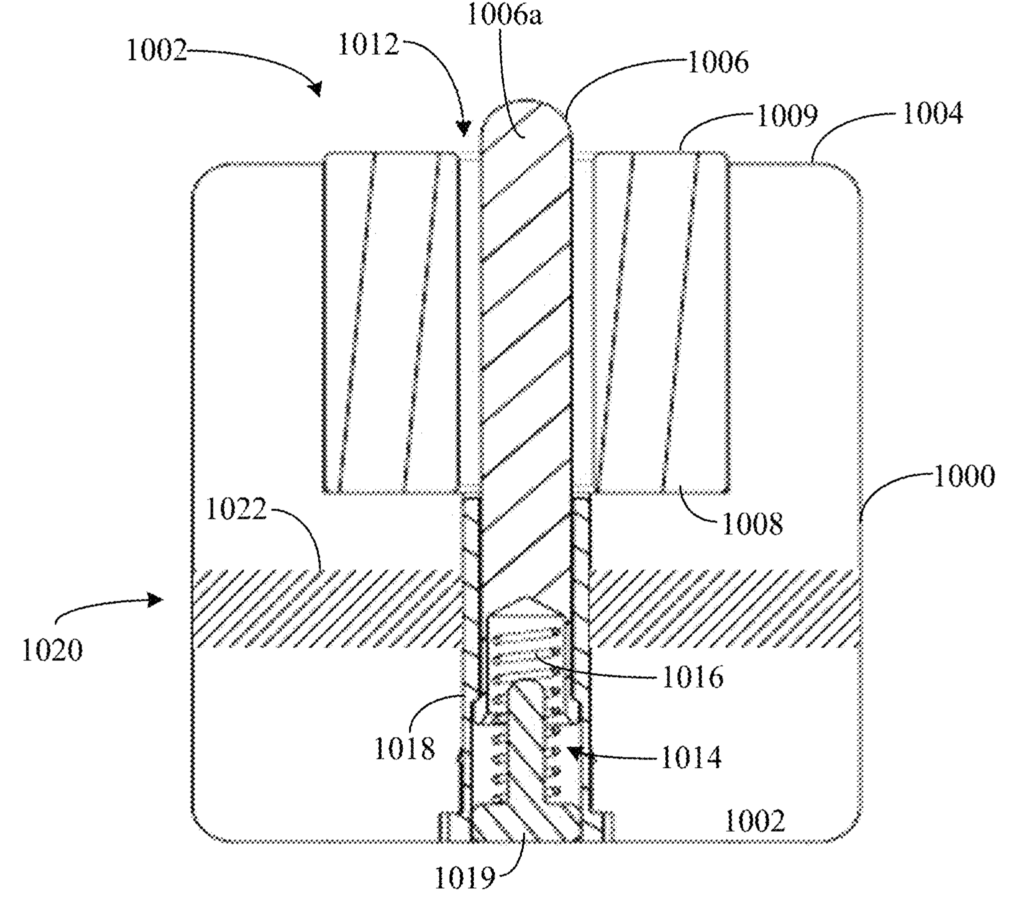
*Figure 10*

Figure 14C 1430
1434a
1434
1432
(D)
1436
1434c
1434b
1438
1440
(-)
(+)
1442
(+) or (-)
1450
3-Phase Rectifier
1543
1452

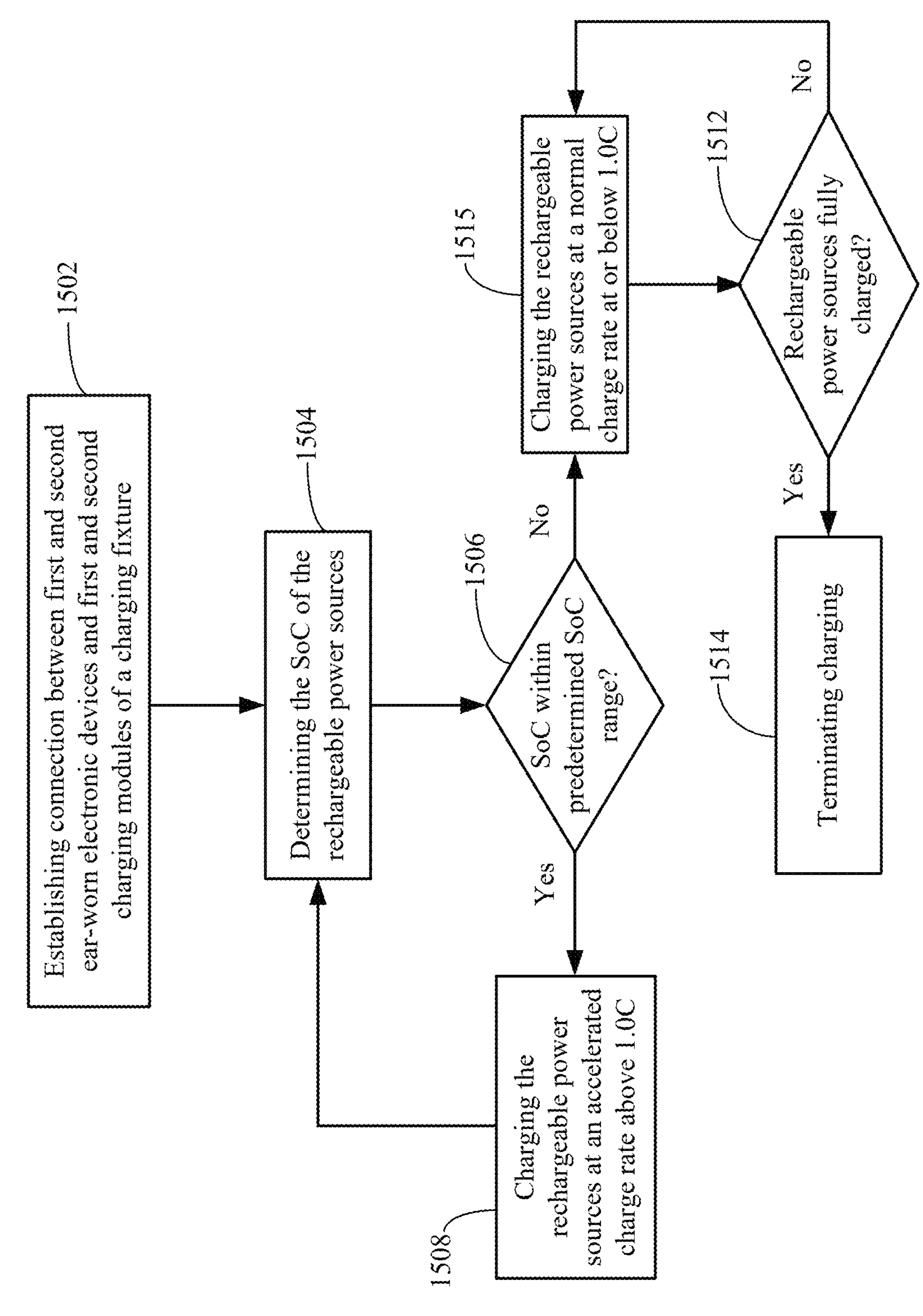
Figure 15
1502
Establishing connection between first and second ear-worn electronic devices and first and second charging modules of a charging fixture
1504
Determining the SoC of the rechargeable power sources
1506
SoC within predetermined SoC range?
Yes
No
1508
Charging the rechargeable power sources at an accelerated charge rate above 1.0C
1515
Charging the rechargeable power sources at a normal charge rate at or below 1.0C
1512
Rechargeable power sources fully charged?
Yes
No
1514
Terminating charging

SYSTEM FOR CHARGING AN EAR-WORN ELECTRONIC DEVICE

RELATED APPLICATIONS

This application is a continuation of U.S. patent application Ser. No. 18/924,062, filed Oct. 23, 2024, which is a continuation U.S. patent application Ser. No. 18/810,014, filed Aug. 20, 2024, which is a continuation of U.S. patent application Ser. No. 17/553,716, filed Dec. 16, 2021, now U.S. Pat. No. 12,101,588 issued on Sep. 24, 2024, which is a continuation of PCT Application No. PCT/US2020/041956, filed Jul. 14, 2020, which claims priority to U.S. Provisional Application No. 62/876,454, filed Jul. 19, 2019, and U.S. Provisional Application No. 62/943,375, filed Dec. 4, 2019, the content of which are hereby incorporated by reference in their entireties.

TECHNICAL FIELD

This application relates generally to ear-worn electronic devices, including hearing devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and transmitting information from the hearing device. For performing such wireless communication, hearing devices such as hearing aids can include a wireless transceiver and an antenna. In order to provide power to electronic circuitry of a hearing device, a rechargeable battery is often housed within the hearing device, which requires routine charging to ensure proper operation of the hearing device.

SUMMARY

Embodiments are directed to a system comprising at least one hearing device configured to be worn at, in or on an ear of a wearer. The hearing device comprises a rechargeable power source, power management circuitry, and a first charging interface comprising a first cathode contact and a first anode contact spaced apart from the first cathode contact. A charging module comprises a second charging interface configured to detachably couple with the first charging interface of the hearing device. The second charging interface comprises a second anode contact having a contact surface and a displaceable second cathode contact. An arrangement is configured to displace at least a portion of the second cathode contact above the contact surface to facilitate electrical contact between the first and second cathode contacts prior to electrical contact between the first and second anode contacts. Charging circuitry is coupled to the second charging interface and configured to charge the rechargeable power source of the hearing device.

Embodiments are directed to a system, comprising at least one hearing device configured to be worn at, in or on an car of a wearer. The hearing device comprises a rechargeable power source, power management circuitry, and a first charging interface comprising a first cathode contact and a first anode contact spaced apart from the first cathode contact. The first anode contact can comprise a plurality of electrode elements each having a non-polygonal shape such a curvilinear, round, elliptical, oval or other closed curved shape comprising only or predominately curved lines. The first anode contact can comprise a plurality of electrode elements each having a polygonal shape such as a square, rectangular, triangular or any other closed plane shape formed with three or more straight lines (e.g., polygonal shapes having from three to twelve sides). The first anode contact can comprise a plurality of electrode elements having a combination of non-polygonal and polygonal shapes. A charging module comprises a second charging interface configured to detachably couple with the first charging interface of the hearing device. The second charging interface comprises a second anode contact having a contact surface and a displaceable second cathode contact. An arrangement is configured to displace at least a portion of the second cathode contact above the contact surface to facilitate electrical contact between the first and second cathode contacts prior to electrical contact between the first and second anode contacts. Charging circuitry of the charging module is coupled to the second charging interface and configured to charge the rechargeable power source of the hearing device.

Embodiments are directed to a system comprising at least one hearing device configured to be worn at, in or on an ear of a wearer. The hearing device comprises a rechargeable power source, power management circuitry, and a first charging interface comprising a first cathode contact surrounded by a first anode contact. The first anode contact can comprise a plurality of electrode elements each having a non-polygonal shape such a curvilinear, round, elliptical, oval or other closed curved shape comprising only or predominately curved lines. The first anode contact can comprise a plurality of electrode elements each having a polygonal shape such as a square, rectangular, triangular or any other closed plane shape formed with three or more straight lines (e.g., polygonal shapes having from three to twelve sides). The first anode contact can comprise a plurality of electrode elements having a combination of non-polygonal and polygonal shapes. A charging module comprises a second charging interface configured to detachably couple with the first charging interface of the hearing device. The second charging interface comprises a second anode contact having a contact surface, a through-hole, and a second cathode contact displaceable within the through-hole. A biasing arrangement is configured to bias at least a portion of the second cathode contact above the contact surface to facilitate electrical contact between the first and second cathode contacts prior to electrical contact between the first and second anode contacts. Charging circuitry of the charging module is coupled to the second charging interface and configured to charge the rechargeable power source of the hearing device. A retention arrangement is disposed on one or both of the hearing device and the charging module. The retention arrangement is configured to maintain engagement between the first and second charging interfaces during charging of the rechargeable power source of the hearing device.

Embodiments are directed to a system comprising at least one hearing device configured to be worn at, in or on an car of a wearer. The hearing device comprises a rechargeable power source and a first charging interface comprising a first cathode contact and a first anode contact spaced apart from the first cathode contact. The first anode contact can comprise a plurality of electrode elements each having a non-polygonal shape such as a curvilinear, round, elliptical, oval or other closed curved shape comprising only or predominately curved lines. The first anode contact can comprise a plurality of electrode elements each having a polygonal shape such as a square, rectangular, triangular or any other closed plane shape formed with three or more straight lines (e.g., polygonal shapes having from three to twelve sides). The first anode contact can comprise a plurality of electrode elements having a combination of non-polygonal and polygonal shapes. The first anode contact comprises a plurality of first electrode elements configured to communicate power and one or more disparate information signals. A charging module comprises a second charging interface configured to detachably couple with the first charging interface of the hearing device and comprises a second cathode contact and a second anode contact. The second anode contact comprises a plurality of second electrode elements configured to communicate power and the one or more disparate information signals. Charging circuitry of the charging module is coupled to the second charging interface and configured to charge the rechargeable power source of the hearing device. The first and second electrode elements are configured to communicate power and the one or more information signals between the charging module and the hearing device.

Embodiments are directed to a system comprising at least one hearing device configured to be worn at, in or on an car of a wearer. The hearing device comprises a rechargeable power source and a first charging interface comprising a plurality of first electrode elements. The plurality of first electrode elements comprises first cathode and anode contacts configured to communicate power and a first data contact configured to communicate one or more disparate information signals. The first anode contact can comprise a plurality of electrode elements each having a non-polygonal shape such as a curvilinear, round, elliptical, oval or other closed curved shape comprising only or predominately curved lines. The first anode contact can comprise a plurality of electrode elements each having a polygonal shape such as a square, rectangular, triangular or any other closed plane shape formed with three or more straight lines (e.g., polygonal shapes having from three to twelve sides). The first anode contact can comprise a plurality of electrode elements having a combination of non-polygonal and polygonal shapes. A charging module comprises a second charging interface configured to detachably couple with the first charging interface of the hearing device and comprises a plurality of second electrode elements. The plurality of second electrode elements comprises second cathode and anode contacts configured to communicate power and a second data contact configured to communicate one or more disparate information signals. Charging circuitry of the charging module is coupled to the second charging interface and configured to charge the rechargeable power source of the hearing device.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 8C illustrates a charging interface of one or both of an ear-worn electronic device and a charging module in accordance with any of the embodiments disclosed herein;

FIG. 8D illustrates a charging interface of one or both of an ear-worn electronic device and a charging module in accordance with any of the embodiments disclosed herein;

FIG. 8E illustrates a charging interface of one or both of an ear-worn electronic device and a charging module in accordance with any of the embodiments disclosed herein;

FIG. 8F illustrates a charging interface of an ear-worn electronic device in accordance with any of the embodiments disclosed herein;

FIG. 8G illustrates a charging interface of an ear-worn electronic device in accordance with any of the embodiments disclosed herein;

FIG. 8H illustrates a charging interface of an ear-worn electronic device in accordance with any of the embodiments disclosed herein;

FIG. 8I illustrates a charging interface of an ear-worn electronic device in accordance with any of the embodiments disclosed herein;

FIG. 9 is a cross-sectional view of a portion of a hearing device comprising charging circuitry in accordance with any of the embodiments disclosed herein;

FIG. 10 is a cross-sectional view of a portion of a charging module comprising charging circuitry in accordance with any of the embodiments disclosed herein;

FIG. 14C illustrates a charging interface of a hearing device comprising a central data pin surrounded by split-ring pin connectors coupled to a multi-phase rectifier in accordance with any of the embodiments disclosed herein;

FIG. 14D illustrates a charging interface of a charging module comprising a central data pin surrounded by split-ring pin connectors in accordance with any of the embodiments disclosed herein;

FIG. 15 illustrates a method of implementing accelerated charging of one or more hearing devices using a charging module in accordance with any of the embodiments disclosed herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
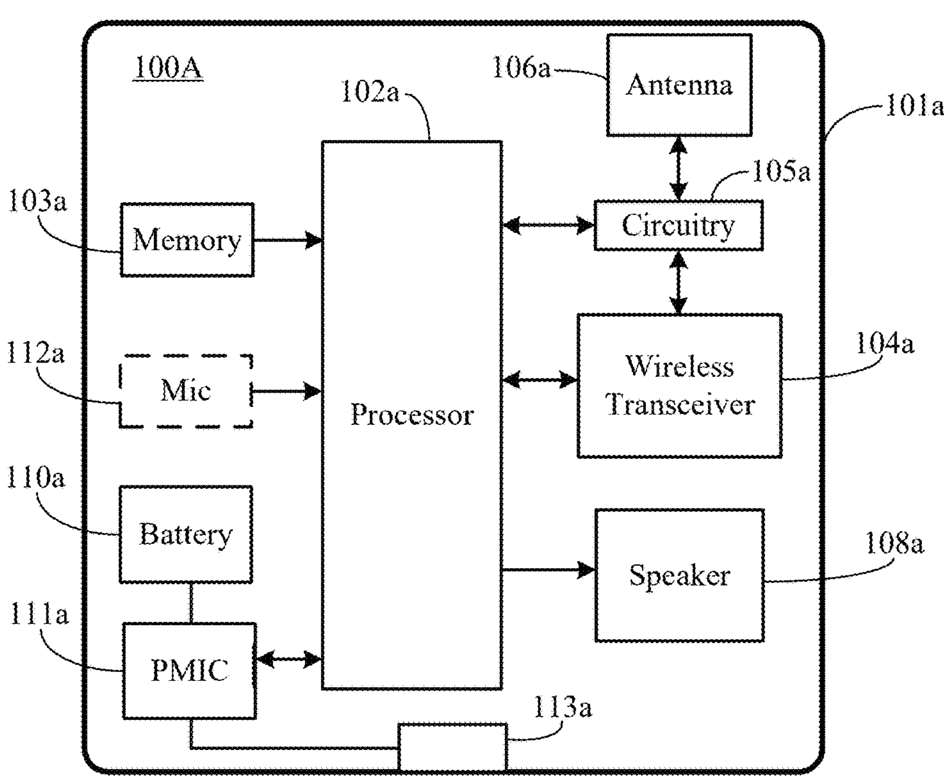
FIGS. 1A and 1B illustrate an ear-worn electronic device arrangement incorporating charging circuitry and functionality in accordance with any of the embodiments disclosed herein.

It is understood that the embodiments described herein may be used with any ear-worn or ear-level electronic device without departing from the scope of this disclosure. The devices depicted in the figures are intended to demonstrate the subject matter, but not in a limited, exhaustive, or exclusive sense. Ear-worn electronic devices (also referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed. Typical components of a hearing device can include a processor (e.g., a digital signal processor or DSP), memory circuitry, power management circuitry, one or more communication devices (e.g., a radio, a near-field magnetic induction (NFMI) device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate an antenna coupled to a high-frequency transceiver, such as a 2.4 GHz radio. The RF transceiver can conform to an IEEE 802.11 (e.g., WiFi®) or Bluetooth® (e.g., BLE, Bluetooth® 4.2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure. Hearing devices that include a left ear device and a right car device can be configured to effect bi-directional communication (e.g., wireless communication) therebetween, so as to implement ear-to-ear communication between the left and right car devices.

The term hearing device of the present disclosure refers to a wide variety of car-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-car (BTE), in-the-car (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

Figure 1B:
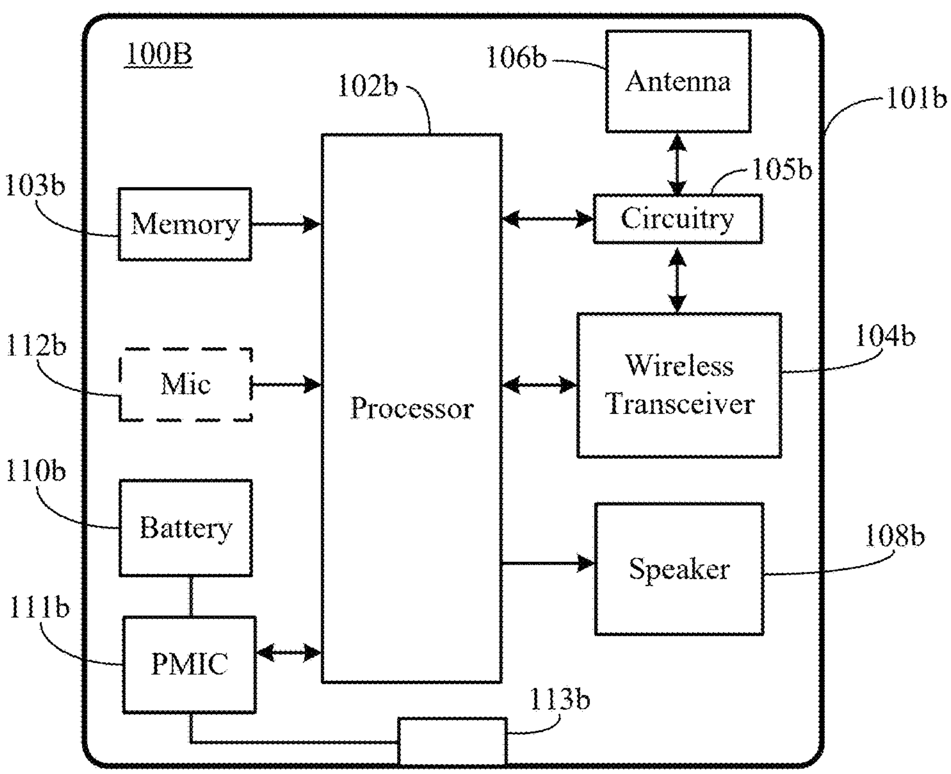

FIGS. 1A and 1B illustrate various components of a representative hearing device arrangement in accordance with various embodiments. FIGS. 1A and 1B illustrate first and second hearing devices 100A and 100B configured to be supported at, by, in or on left and right ears of a wearer. In some embodiments, a single hearing device 100A or 100B can be supported at, by, in or on the left or right ear of a wearer. As illustrated, the first and second hearing devices 100A and 100B include the same functional components. It is understood that the first and second hearing devices 100A and 100B can include different functional components. The first and second hearing devices 100A and 100B can be representative of any of the hearing devices disclosed herein.

The first and second hearing devices 100A and 100B include an enclosure 101*a*, 101*b* configured for placement, for example, over or on the car, entirely or partially within the external car canal (e.g., between the pinna and ear drum) or behind the car. Disposed within the enclosure 101*a*, 101*b* is a processor 102*a*, 102*b* which incorporates or is coupled to memory 103*a*, 103*b*. The processor 102*a*, 102*b* can include or be implemented as a multi-core processor, a digital signal processor (DSP), an audio processor or a combination of these processors. For example, the processor 102*a*, 102*b* may be implemented in a variety of different ways, such as with a mixture of discrete analog and digital components that include a processor configured to execute programmed instructions contained in a processor-readable storage medium (e.g., solid-state memory, e.g., Flash).

The processor 102*a*, 102*b* is coupled to a wireless transceiver 104*a*, 104*b* (also referred to herein as a radio), such as a BLE transceiver or other IEEE 802.11 compliant transceiver. The wireless transceiver 104*a*, 104*b* is operably coupled to an antenna 106*a*, 106*b* configured for transmitting and receiving radio signals. Impedance matching circuitry 105*a*, 105*b* can be operably coupled to the wireless transceiver 104*a*, 104*b* and the antenna 106*a*, 106*b*. The antenna 106*a*, 106*b* is disposed in, on, or extends from the enclosure 101*a*, 101*b*. The wireless transceiver 104*a*, 104*b* and the antenna 106*a*, 106*b* can be configured to operate in the 2.4 GHz ISM frequency band or other applicable communication band (referred to as the "Bluetooth® band" herein). The wireless transceiver 104*a*, 104*b* and antenna 106*a*, 106*b* can be configured to enable car-to-car communication between the two hearing devices 100A and 100B, as well as communications with an external device (e.g., a smartphone or a digital music player).

A battery 110*a*, 110*b* or other power source (rechargeable or conventional) is provided within the enclosure 101*a*, 101*b* and is configured to provide power to the various components of the hearing devices 100A and 100B. The battery 110*a*, 110*b* is coupled to power management circuitry 111*a*, 111*b*, such as a power management integrated circuit (PMIC). The power management circuitry 111*a*, 111*b* is coupled to a charging interface 113*a*, 113*b*, which is configured to physically and electrically couple to a corresponding charging interface of a charging module. A speaker or receiver 108*a*, 108*b* is coupled to an amplifier (not shown) and the processor 102*a*, 102*b*. The speaker or receiver 108*a*, 108*b* is configured to generate sound which is communicated to the wearer's ear.

In some embodiments, the hearing devices 100A and 100B include a microphone 112*a*, 112*b* mounted on or inside the enclosure 101*a*, 101*b*. The microphone 112*a*, 112*b* may be a single microphone or multiple microphones, such as a microphone array. The microphone 112*a*, 112*b* can be coupled to a preamplifier (not shown), the output of which is coupled to the processor 102*a*, 102*b*. The microphone 112*a*, 112*b* receives sound waves from the environment and converts the sound into an input signal. The input signal is amplified by the preamplifier and sampled and digitized by an analog-to-digital converter of the processor 102*a*, 102*b*, resulting in a digitized input signal. In some embodiments (e.g., hearing aids), the processor 102*a*, 102*b* (e.g., DSP circuitry) is configured to process the digitized input signal into an output signal in a manner that compensates for the wearer's hearing loss. When receiving an audio signal from an external source, the wireless transceiver 104*a*, 104*b* may produce a second input signal for the DSP circuitry of the processor 102*a*, 102*b* that may be combined with the input signal produced by the microphone 112*a*, 112*b* or used in place thereof. In other embodiments, (e.g., hearables), the processor 102*a*, 102*b* can be configured to process the digitized input signal into an output signal in a manner that is tailored or optimized for the wearer (e.g., based on wearer preferences). The output signal is then passed to an audio output stage that drives the speaker or receiver 108*a*, 108*b*, which converts the output signal into an audio output.

Figure 2A:
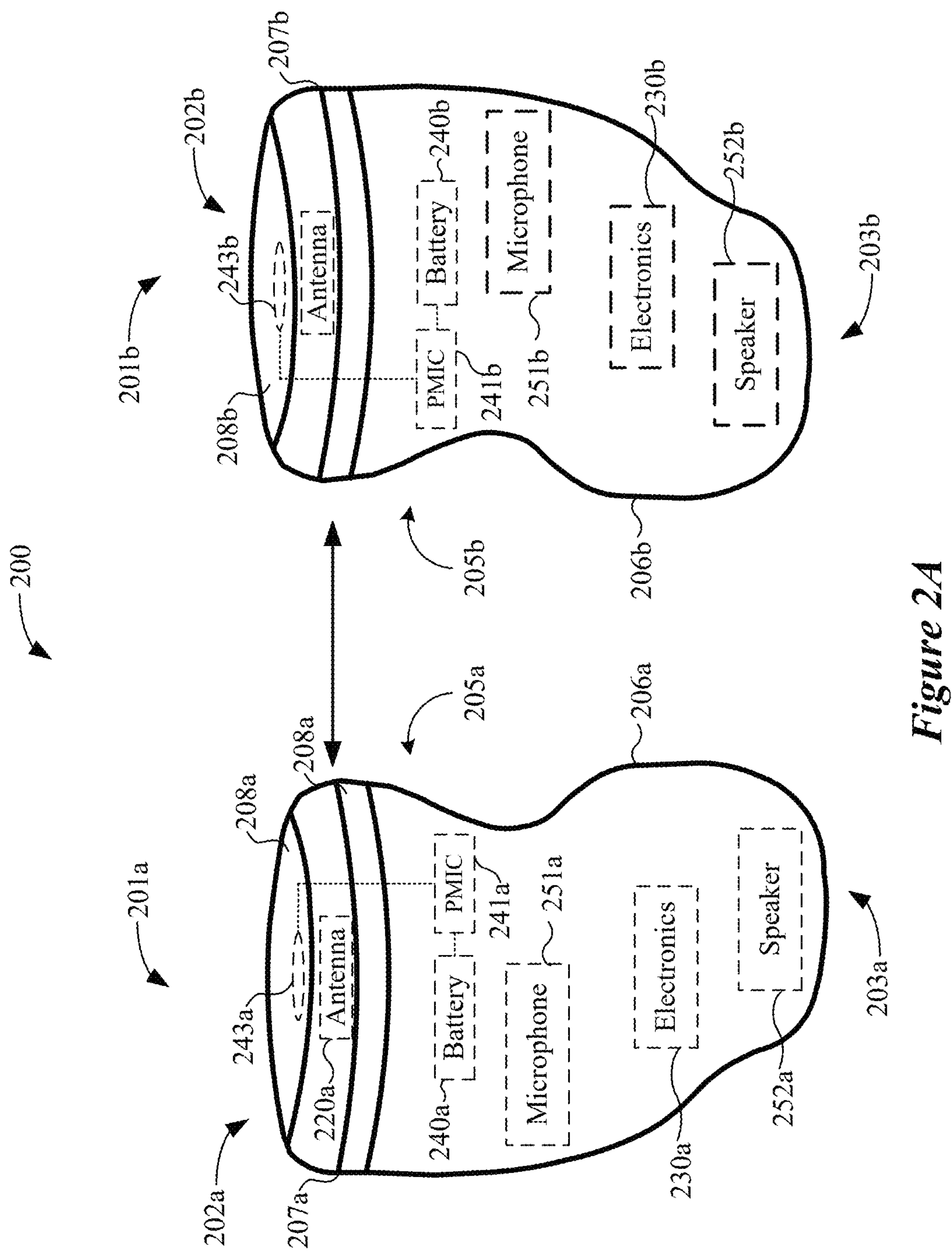
FIG. 2A illustrates a custom hearing aid system which incorporates charging circuitry and functionality in accordance with any of the embodiments disclosed herein.
Figure 2B:
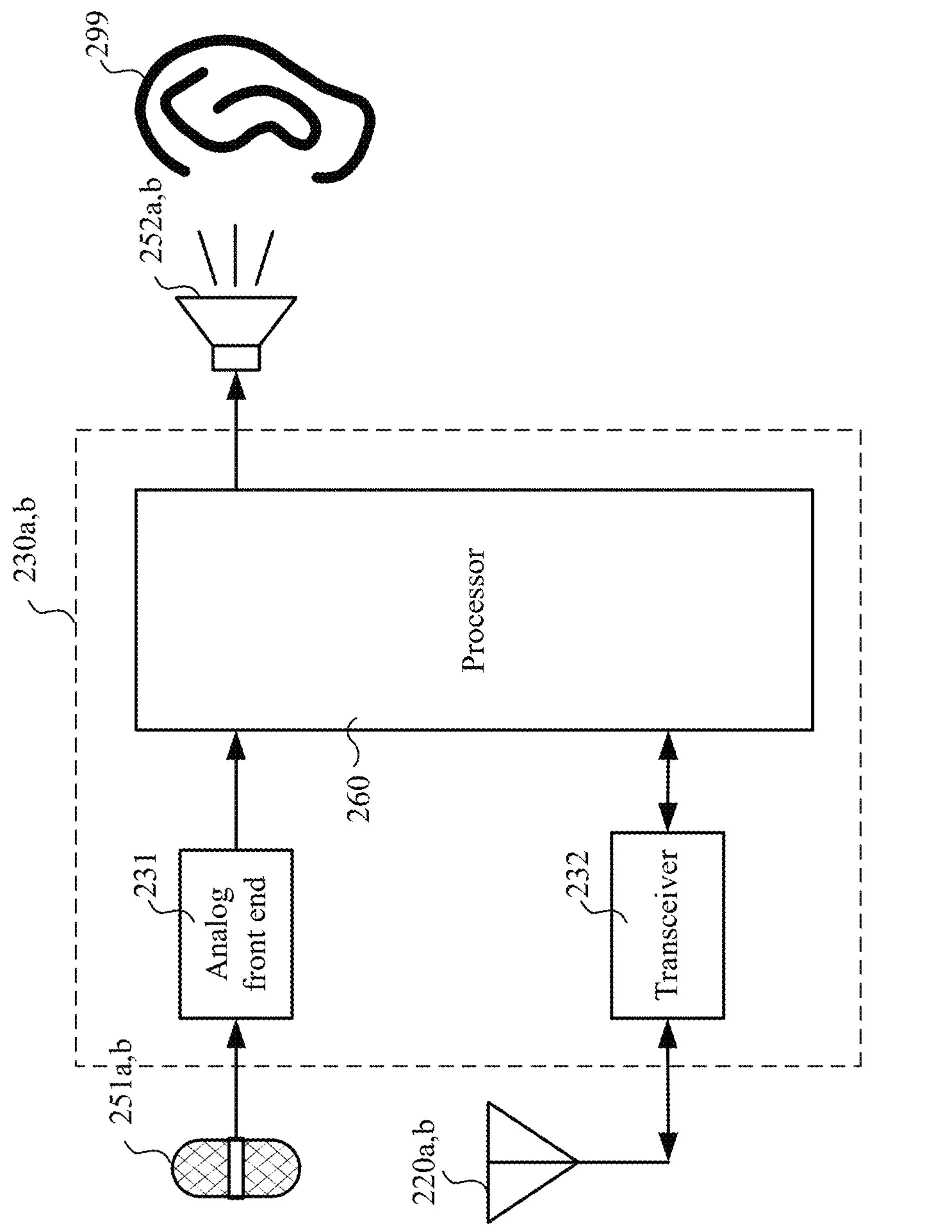
FIG. 2B illustrates a custom hearing aid system which incorporates charging circuitry and functionality in accordance with any of the embodiments disclosed herein.

Some embodiments are directed to a custom hearing aid, such as an ITC, CIC, or IIC hearing aid, for example. For example, some embodiments are directed to a custom hearing aid which includes a wireless transceiver and an antenna arrangement configured to operate in the 2.4 GHz ISM frequency band (referred to as the "Bluetooth® band" herein). FIGS. 2A and 2B illustrate a custom hearing aid system which includes two hearing devices, e.g., left 201*a* and right 201*b* side hearing devices, configured to wirelessly communicate with each other and external devices and systems. FIG. 2A conceptually illustrates functional blocks of the hearing devices 201*a*, 201*b*. The position of the functional blocks in FIG. 2A does not necessarily indicate actual locations of components that implement these functional blocks within the hearing devices 201*a*, 201*b*. FIG. 2B is a block diagram of components that may be disposed at least partially within the enclosure 205*a*, 205*b* of the hearing device 201*a*, 201*b*.

Each hearing device 201*a*, 201*b* includes a physical enclosure 205*a*, 205*b* that encloses an internal volume. The enclosure 205*a*, 205*b* is configured for at least partial insertion within the wearer's ear canal. The enclosure 205*a*, 205*b* includes an external side 202*a*, 202*b* that faces away from the wearer and an internal side 203*a*, 203*b* that is inserted in the car canal. The enclosure 205*a*, 205*b* comprises a shell 206*a*, 206*b* and a faceplate 207*a*, 207*b*. The faceplate 207*a*, 207*b* may include a battery door 208*a*, 208*b* or drawer disposed near the external side 202*a*, 202*b* of the enclosure 205*a*, 205*b* and configured to allow the battery 240*a*, 240*b* to be inserted and removed from the enclosure 205*a*, 205*b*. An antenna 220*a*, 220*b* can be mounted to the faceplate 207*a*, 207*b* or elsewhere in the enclosure 205*a*, 205*b*. The antenna arrangement 220*a*, 220*b* can include a matching circuit that compensates for a smaller size antenna which allows the antenna arrangement 220*a*, 220*b* to fit within a customized device, such as a device that fits partially or fully within the car canal of the wearer. The matching circuit can be designed so that the power transfer from the transceiver of the electronics 230*a*, 230*b* to the antenna arrangement 220*a*, 220*b*, provides a specified antenna efficiency, e.g., an optimal antenna efficiency for the customized environment.

The battery 240*a*, 240*b* powers electronic circuitry 230*a*, 230*b* which is also disposed within the shell 206*a*, 206*b*. As illustrated in FIGS. 2A and 2B, the hearing device 201*a*, 201*b* may include one or more microphones 251*a*, 251*b* configured to pick up acoustic signals and to transduce the acoustic signals into microphone electrical signals. The electrical signals generated by the microphones 251*a*, 251*b* may be conditioned by an analog front end 231 (see FIG. 2B) by filtering, amplifying and/or converting the microphone electrical signals from analog to digital signals so that the digital signals can be further processed and/or analyzed by the processor 260. The processor 260 may perform signal processing and/or control various tasks of the hearing device 201*a*, 201*b*. In some implementations, the processor 260 comprises a DSP that may include additional computational processing units operating in a multi-core architecture.

The processor 260 is configured to control wireless communication between the hearing devices 201*a*, 201*b* and/or an external accessory device (e.g., a smartphone, a digital music player) via the antenna 220*a*, 220*b*. The wireless communication may include, for example, audio streaming data and/or control signals. The electronic circuitry 230*a*, 230*b* of the hearing device 201*a*, 201*b* includes a transceiver 232. The transceiver 232 has a receiver portion that receives communication signals from the antenna arrangement 220*a*, 220*b*, demodulates the communication signals, and transfers the signals to the processor 260 for further processing. The transceiver 232 also includes a transmitter portion that modulates output signals from the processor 260 for transmission via the antenna arrangement 220*a*, 220*b*. Electrical signals from the microphone 251*a*, 251*b* and/or wireless communication received via the antenna 220*a*, 220*b* may be processed by the processor 260 and converted to acoustic signals played to the wearer's ear 299 via a speaker 252*a*, 252*b*.

The battery 240*a*, 240*b* is of a rechargeable type, such as a lithium-ion battery for example. Power management circuitry 241*a*, 241*b* (e.g., a PMIC) is operatively coupled to the battery 240*a*, 240*b* and to a charging interface 243*a*, 243*b*. The charging interface 243*a*, 243*b* is configured to physically and electrically couple to a corresponding charging interface of a charging module.

The use of rechargeable batteries in hearing devices (e.g., hearing aids) has been well-received in the marketplace. Self-contained batteries require electrical contacts for recharging. One complication of contact charging is the difficulty of placing a relatively small hearing device in a charger. Traditional approaches for charging hearing devices often require the wearer to fiddle with the hearing device to achieve the proper connection for charging. There is a need to provide a connection arrangement that allows the wearer to properly attach the hearing device to the charging fixture of the charger with relative ease.

Contact charging requires two electrical connections, namely, an anode (positive) connection and a cathode (negative) connection. When placing a hearing device into a charging fixture, it can be advantageous to connect the cathodes prior to connecting the anodes. For example, connecting the cathodes of the hearing devices and the charging fixture prior to connecting the anodes can serve to provide a consistent inrush current waveform when coupling the hearing devices and charger fixture together. Provision of a consistent inrush current waveform from the charger to the hearing devices informs the charging circuitry of the charger that the hearing devices are properly attached to the proper charging fixture and that a charging procedure can be initiated. If the hearing devices are properly connected to the charging fixture, full charging power can be supplied by the charging fixture to the hearing devices. If one or both of the hearing devices are not properly connected to the charging fixture, charging through the improper connection can be disabled. This can protect against the presence of foreign objects (e.g., keys, coins, other hearing devices) that can be intentionally or unintentionally introduced into the charging fixture. In some implementations, connecting the cathodes of the hearing devices and charger fixture prior to connecting the anodes can serve to establish a ground, which can reduce or minimize spurious electrical spikes in the circuitry.

A system comprising a charging module and at least one hearing device in accordance with any of the embodiments disclosed herein provides a number of technical advantages over conventional charging arrangements. As discussed above, a charging system according to any of the embodiments disclosed herein facilitates connection between charger and hearing device cathodes prior to connection between anodes, which provides for a consistent inrush current waveform when coupling the hearing devices and charger fixture together. A charging system according to any of the embodiments disclosed herein provides enhanced detection of incorrect placement of hearing devices and/or presence of foreign conductive objects at the charging interface, which results in disabling of charging through the improper connection. A charging system according to any of the embodiments disclosed herein significantly reduces or minimizes spurious electrical spikes in the circuitry, by ensuring that the cathodes of the hearing devices and charger fixture are connected prior to connecting the anodes.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A system comprising at least one hearing device configured to be worn at, in or on an ear of a wearer, the hearing device comprising a rechargeable power source, power management circuitry, and a first charging interface comprising a first cathode contact and a first anode contact spaced apart from the first cathode contact. A charging module comprises a second charging interface configured to detachably couple with the first charging interface of the hearing device, the second charging interface comprising a second anode contact having a contact surface and a displaceable second cathode contact; an arrangement configured to displace at least a portion of the second cathode contact above the contact surface to facilitate electrical contact between the first and second cathode contacts prior to electrical contact between the first and second anode contacts; and charging circuitry coupled to the second charging interface and configured to charge the rechargeable power source of the hearing device.

Example Ex2. The system according to Ex1, wherein the second charging interface comprises a through-hole, and the second cathode contact is displaceable within the through-hole; and the displacement arrangement comprises a biasing arrangement configured to bias at least a portion of the second cathode contact above the contact surface.

Example Ex3. The system according to Ex2, wherein the second cathode contact comprises an elongated electrode; and the biasing arrangement comprises a spring.

Example Ex4. The system according to Ex2 or Ex3, wherein the second cathode contact and the biasing arrangement define a spring-loaded pogo pin assembly.

Example Ex5. The system according to one or more of Ex1 to Ex4 comprising a retention arrangement disposed on one or both of the hearing device and the charging module, the retention arrangement configured to maintain engagement between the first and second charging interfaces during charging of the rechargeable power source of the hearing device.

Example Ex6. The system according to Ex5, wherein the retention arrangement comprises one or more magnets or a mechanical retention arrangement.

Example Ex7. The system according to one or more of Ex1 to Ex6, wherein the first anode contact is configured to communicate power and one or more disparate information signals, the second anode contact is configured to communicate power and the one or more disparate information signals, and the first and second anode contacts are configured to communicate power and the one or more disparate information signals between the charging module and the hearing device.

Example Ex8. The system according to Ex7, wherein the one or more disparate information signals comprise one or more of data signals generated by one or both of the charging module and the hearing device, audio signals generated by one or both of the charging module and the hearing device, and signals received from one or more accessory devices configured to communicatively couple to one or both of the charging module and the hearing device.

Example Ex9. The system according to one or more of Ex1 to Ex8, wherein the first and second anode contacts comprise electrodes having a curvilinear, annular, oval, elliptical or polygonal shape.

Example Ex10. The system according to one or more of Ex1 to Ex9, wherein the first anode contact comprises a plurality of electrode elements, and the first cathode contact is surrounded by the plurality of electrode elements of the first anode contact.

Example Ex11. The system according to Ex10, wherein the second anode contact comprises a plurality of electrode elements, and the second cathode contact is surrounded by the plurality of electrode elements of the second anode contact.

Example Ex12. The system according to Ex10 or Ex11, wherein one of both of the plurality of electrodes of the first anode contact are substantially equidistant from the first cathode contact, and the plurality of electrodes of the second anode contact are substantially equidistant from the second cathode contact.

Example Ex13. The system according to Ex10 or Ex11, wherein one of both of the plurality of electrodes of the first anode contact are arranged in a substantially triangular pattern relative to the first cathode contact, and the plurality of electrodes of the second anode contact are arranged in a substantially triangular pattern relative to the second cathode contact.

Example Ex14. The system according to one or more of Ex1 to Ex13, wherein the hearing device comprises an in-the-ear (ITE), in-the-canal (ITC), invisible-in-canal (IIC) or completely-in-the-canal (CIC) device comprising a housing having a preformed or formable shape that conforms to a shape of the wearer's ear canal.

Example Ex15. The system according to one or more of Ex1 to Ex14, wherein the charging circuitry is configured to charge the rechargeable power source of the hearing device at an accelerated charge rate above 1.0C when a state of charge (SoC) of the rechargeable power sources is within a predetermined SoC range.

Figure 3:
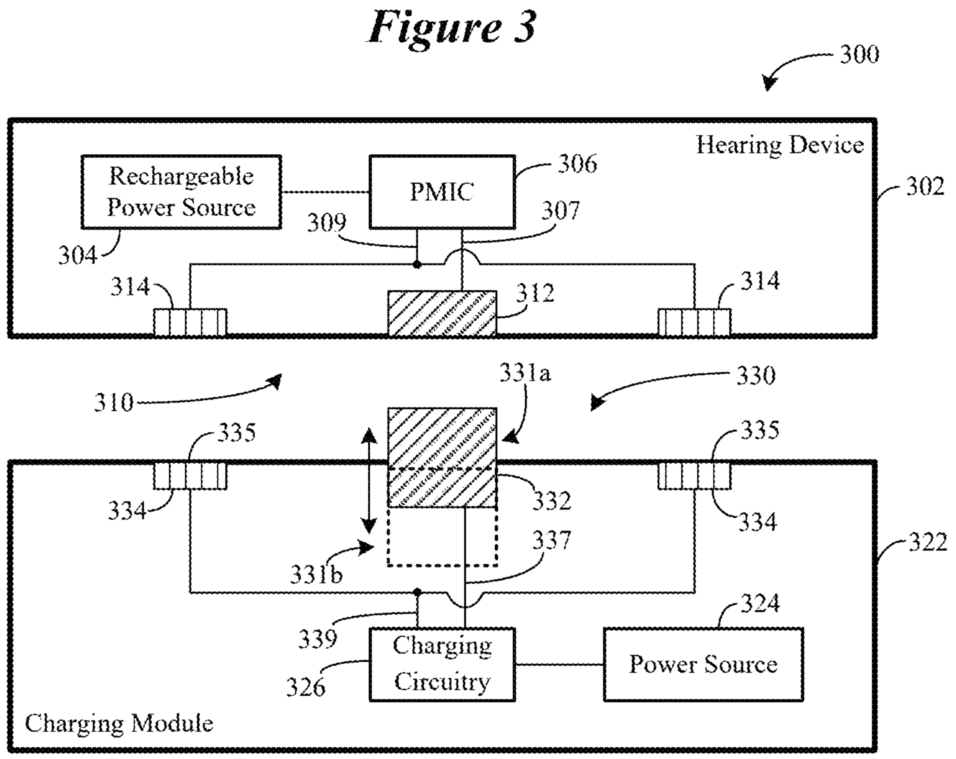
FIG. 3 illustrates an ear-worn electronic device and a charging module respectively incorporating charging circuitry and functionality in accordance with any of the embodiments disclosed herein.

FIG. 3 illustrates a system in accordance with any of the embodiments disclosed herein. FIG. 3 shows a cross-sectional view of a portion of an ear-worn electronic hearing device 302 and a portion of a charging module 322. The components of the hearing device 302 shown in FIG. 3 are disposed in or on a housing configured to be worn at, in or on an car of a wearer. The hearing device 302 includes a rechargeable power source 304 (e.g., a lithium-ion battery) coupled to power management circuitry 306 (e.g., a PMIC). The power management circuitry 306 is coupled to a first charging interface 310 comprising a first cathode contact 312 and a first anode contact 314 spaced apart from the first cathode contact 312. In the embodiment shown in FIG. 3, the power management circuitry 306 is coupled to the first cathode contact 312 via a first connection 307 and to the first anode contact 314 via a second connection 309. The first anode contact 314 can comprise a single contact or a multiplicity of contacts coupled to the second connection 309.

The charging module 322 includes a second charging interface 330 configured to detachably couple (e.g., mechanically and electrically) with the first charging interface 310 of the hearing device 302. The second charging interface 330 includes a second anode contact 334 having a contact surface 335 and a displaceable second cathode contact 332. The charging module 322 includes charging circuitry 326 coupled to the second charging interface 330 and a power source 324. The power source 324 can be configured to receive power from a standard wall outlet and/or can include a rechargeable or a conventional battery. In some embodiments, the power source 324 can be configured to receive wireless power from an external power source (e.g., inductive, radiofrequency, optical). For example, the power source 324 can be configured to implement inductive charging in accordance with the Qi open interface standard developed by the Wireless Power Consortium. In the embodiment shown in FIG. 3, the charging circuitry 326 is coupled to the second cathode contact 332 via a connection 337 and to the second anode contact 334 via a second connection 339. The second anode contact 334 can comprise a single contact or a multiplicity of contacts coupled to the second connection 339.

The second cathode contact 332 is configured for displacement between a first position 331*a* above the contact surface 335 of the second anode contact 334 and a second position 331*b* at or below the contact surface 335 of the second anode contact 334. In some configurations, the second cathode contact 332 can be configured for displacement between the first position 331*a* above the contact surface 335 and a second position 331*b* above the contact surface 335 but below the first position 331*a*.

When the hearing device 302 and the charging module 322 are in a non-contacting relationship, such as shown in FIG. 3, the second cathode contact 332 is positioned at the first position 331*a* above the contact surface 335 of the second anode contact 334. When the hearing device 302 and the charging module 322 are in a contacting relationship, the second cathode contact 332 is movable from the first position 331*a* to the second position 331*b* and establishes electrical contact with the first cathode contact 312 prior to electrical contact being established between the second anode contact 334 and the first anode contact 314.

More particularly, when the hearing device 302 and the charging module 322 are brought into contact with one another, the second cathode contact 332 positioned at the first position 331*a* establishes electrical contact with the first cathode contact 312 of the hearing device 302 prior to electrical contact being established between the first and second anode contacts 314, 334. After first establishing electrical contact between the first and second cathode contacts 312, 332, the second cathode contact 332 is displaced into the body of the charging module 322 as the hearing device 302 is forcibly advanced onto the charging module 322. After displacing the second cathode into the body of the charging module 322 partially or entirely, electrical contact is then established between the first and second anode contacts 314, 334.

The charging module 322 includes an arrangement (shown in other figures) configured to displace at least a portion of the second cathode contact 332 above the contact surface 335 to facilitate electrical contact between the first and second cathode contacts 312, 332 prior to electrical contact between the first and second anode contacts 314, 334. The charging module 322 can also include a retention arrangement (shown in other figures) configured to maintain engagement between the first and second charging interfaces 310, 330 during charging of the rechargeable power source 304 of the hearing device 302. In some embodiments, the retention arrangement can comprise one or more magnets disposed at or near one or both of the first and second charging interfaces 310, 330. In other embodiments, the retention arrangement can comprise a mechanical retention arrangement configured to mechanically maintain engagement between the first and second charging interfaces 310, 330.

Figure 4:
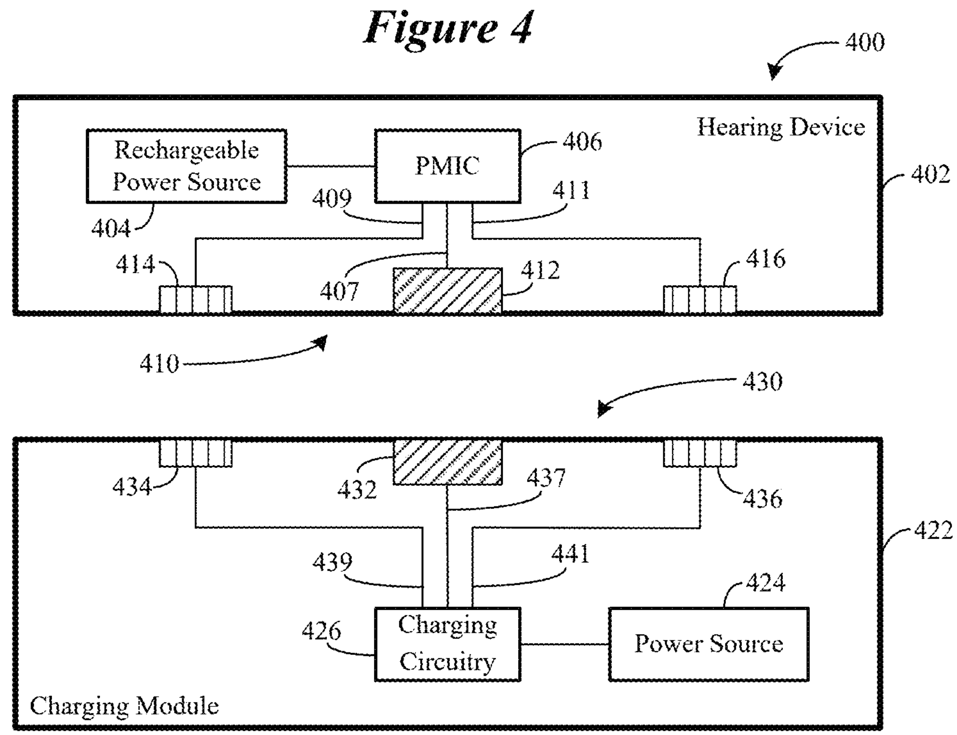
FIG. 4 illustrates an ear-worn electronic device and a charging module respectively incorporating charging circuitry and functionality in accordance with any of the embodiments disclosed herein.

FIG. 4 illustrates a system in accordance with any of the embodiments disclosed herein. FIG. 4 shows a cross-sectional view of a portion of an ear-worn electronic hearing device 402 and a portion of a charging module 422. The components of the hearing device 402 shown in FIG. 4 are disposed in or on a housing configured to be worn at, in or on an car of a wearer. The hearing device 402 includes a rechargeable power source 404 (e.g., a lithium-ion battery) coupled to power management circuitry 406 (e.g., a PMIC). The power management circuitry 406 is coupled to a first charging interface 410. In the embodiment shown in FIG. 4, the first charging interface 410 comprises a first cathode contact 412 and a multiplicity of anode contacts, 414, 416. In the illustrative example shown in FIG. 4, the first charging interface 410 includes two anode contacts 414, 416, it being understood that the first charging interface 410 can include more than two spaced-apart anode contacts (e.g., 3, 4, 5 or 6 anode contacts).

In the embodiment shown in FIG. 4, the power management circuitry 406 is coupled to the first cathode contact 412 via a first connection 407 and to the first and second anode contacts 414, 416 via separate connections. As shown, the power management circuitry 406 is coupled to the first anode contact 414 via a connection 409 and to the second anode contact 416 via a connection 411. It is understood that each physically separate anode contact of the first charging interface 410 can be coupled to the power management circuitry 406 via a separate electrical conductor. It is also understood that, in some configurations, the first charging interface 410 can include anode contacts coupled to the power management circuitry 406 via separate connections in combination with two or more anode contacts coupled to the power management circuitry 406 via a common connection.

The charging module 422 includes a second charging interface 430 configured to detachably couple (e.g., mechanically and electrically) with the first charging interface 410 of the hearing device 402. The charging module 422 includes charging circuitry 426 coupled to the second charging interface 430 and a power source 424. The power source 424 can be configured to receive power from a standard wall outlet and/or can include a rechargeable or a conventional battery. In some embodiments, the power source 424 can be configured to receive wireless power from an external power source (e.g., inductive, radiofrequency, optical). For example, the power source 424 can be configured to implement inductive charging in accordance with the Qi open interface standard developed by the Wireless Power Consortium. The second charging interface 430 includes a second cathode contact 432 and a multiplicity of anode contacts 434, 436. In the embodiment shown in FIG. 4, the second cathode contact 432 is fixed in terms of its position on the charging module 422. In this regard, the second cathode contact 432 shown in FIG. 4 it is not a displaceable cathode contact. However, it is understood that, in a variant embodiment of FIG. 4, the second cathode contact 432 can be implemented as a displaceable cathode contact in the manner illustrated and described with reference to FIG. 3.

In the illustrative example shown in FIG. 4, the second charging interface 430 includes two anode contacts 434, 436, it being understood that the second charging interface 430 can include more than two spaced-apart anode contacts (e.g., 3, 4, 5 or 6 anode contacts). The number of anode contacts of the second charging interface 430 may or may not be equal to the number of anode contacts of the first charging interface 410. In the embodiment shown in FIG. 4, the charging circuitry 426 is coupled to the second cathode contact 432 via a connection 437 and to the first and second anode contacts 434, 436 via separate connections. More particularly, the first anode contact 434 is coupled to the charging circuitry 426 via connection 439, and the second anode contact 436 is coupled to the charging circuitry 426 via connection 441.

The charging module 422 can include a retention arrangement (shown in other figures) configured to maintain engagement between the first and second charging interfaces 410, 430 during charging of the rechargeable power source 404 of the hearing device 402. In some embodiments, the retention arrangement can comprise one or more magnets disposed at or near one or both of the first and second charging interfaces 410, 430. In other embodiments, the retention arrangement can comprise a mechanical retention arrangement configured to mechanically maintain engagement between the first and second charging interfaces 410, 430.

Provision of electrically separate anode contacts at the first and second charging interfaces 410, 430 provides for the communication of power and one or more disparate information signals between the charging module 422 and the hearing device 402. For example, charging of the rechargeable power supply 404 can be accomplished via first and second cathode contacts 412, 432 and anode contacts 414, 434. Data signals generated by one or both of the charging module 422 and the hearing device 402 can be communicated via anode contacts 416, 436. Although referred to as anode contacts generally, it is understood that the contacts of the first and second charging interfaces 410, 430 that are used for communicating information signals can be any form of electrical contact. Various types of disparate information signals can be communicated between respective pairs of anode contacts of the first and second charging interfaces 410, 430. The disparate forms of information signals can include state of charge and charging status data, control or command signals, audio signals, video signals, and signals from one or more accessory devices (e.g., smartphone, tablet, wearable sensor) configured to communicatively couple to one or both of the hearing device 402 and charging module 422.

Figure 5:
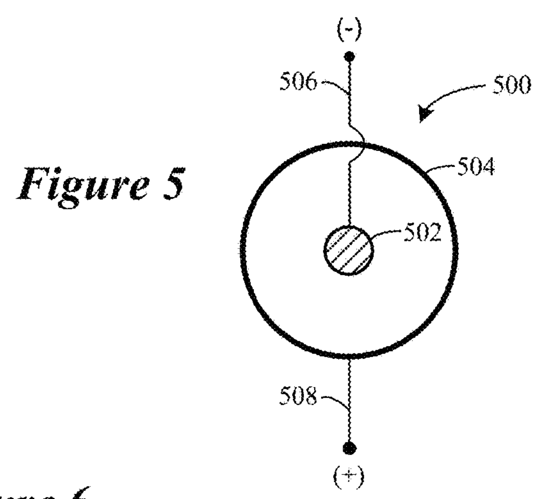
FIG. 5 illustrates a charging interface of one or both of an ear-worn electronic device and a charging module in accordance with any of the embodiments disclosed herein.

FIG. 5 illustrates a charging interface in accordance with any of the embodiments disclosed herein. The charging interface 500 shown in FIG. 5 includes a cathode contact 502, which is typically coupled to a negative contact charging connection 506. The charging interface 500 also includes an anode contact 504, which is typically coupled to a positive contact charging connection 508. In the embodiment shown in FIG. 5, the cathode contact 502 is surrounded by the anode contact 504, which has a continuous annular configuration.

In some embodiments, the hearing device and the charging module can have a charging interface that generally corresponds to the charging interface 500 shown in FIG. 5. When implemented on a hearing device, for example, a region of the cathode contact 502 (e.g., central region) can be recessed relative to a contact surface of the anode contact 504 (see, e.g., FIGS. 9 and 12). When implemented on a charging module, and according to some embodiments, the cathode contact 502 can be displaceable (see, e.g., FIGS. 3, 10, and 11) and proud relative to a contact surface of the anode contact 504. In other embodiments, the cathode contact 502 is a fixed electrical element (non-displaceable) and need not be proud relative to a contact surface of the anode contact 504. Although shown as having a generally circular shape, the cathode and anode contacts 502, 504 can have any curvilinear or polygonal shape.

Figure 6:
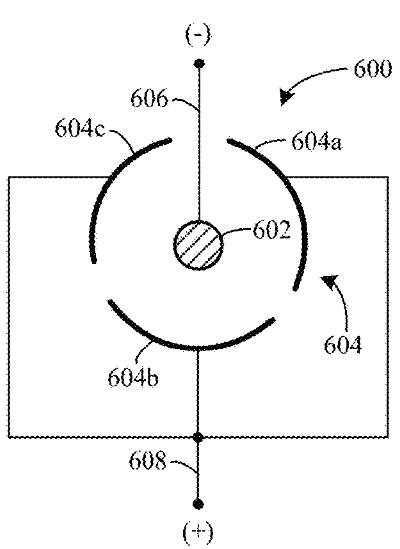
FIG. 6 illustrates a charging interface of one or both of an ear-worn electronic device and a charging module in accordance with any of the embodiments disclosed herein.

FIG. 6 illustrates a charging interface in accordance with any of the embodiments disclosed herein. The charging interface 600 shown in FIG. 6 includes a cathode contact 602, which is typically coupled to a negative contact charging connection 606. The charging interface 600 also includes an anode contact 604, which is typically coupled to a positive contact charging connection 608. In the embodiment shown in FIG. 6, the anode contact 604 comprises a multiplicity of electrode elements 604*a*, 604*b*, 604*c*, each of which is coupled to connection 608. The anode contact 604 has a concentric tri-trace anode configuration. As shown, the cathode contact 602 is surrounded by the concentric tri-trace anode 604 comprising arcuate electrode elements 604*a*, 604*b*, 604*c*. The arcuate electrode elements 604*a*, 604*b*, 604*c* are situated at substantially the same radius (e.g., ~4-5 mm) relative to the cathode contact 602 (e.g., ~2-3 mm diameter). Although three arcuate electrode elements are shown in FIG. 6, the concentric anode 604 can comprise two, four, five or more electrode elements, for example.

In some embodiments, the hearing device and the charging module can have a charging interface that generally corresponds to the charging interface 600 shown in FIG. 6. When implemented on a hearing device, and in accordance with some embodiments, a region of the cathode contact 602 (e.g., central region) can be recessed relative to a contact surface of the anode contact 604 (see, e.g., FIGS. 9 and 12). When implemented on a charging module, for example, the cathode contact 602 can be displaceable (see, e.g., FIGS. 10 and 11) and proud relative to a contact surface of the anode contact 604. Although shown as having a generally circular or arcuate shape, the cathode and anode contacts 602, 604 can have any curvilinear or polygonal shape.

It is understood that the charging interface of the hearing device and that of the charging module can be substantially the same or different in configuration. For example, and in accordance with some embodiments, the charging module can have a charging interface corresponding to the charging interface 500 shown in FIG. 5 (cathode contact surrounded by an annular anode contact). In such embodiments, the hearing device can have a charging interface corresponding to the charging interface 600 shown in FIG. 6 (cathode contact surrounded by tri-trace anode contact).

Figure 7:
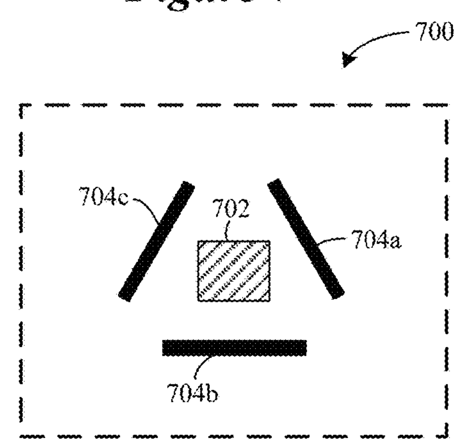
FIG. 7 illustrates a charging interface of one or both of an ear-worn electronic device and a charging module in accordance with any of the embodiments disclosed herein.

FIG. 7 illustrates a charging interface in accordance with any of the embodiments disclosed herein. The charging interface 700 shown in FIG. 7 includes a cathode contact 702 surrounded by a multiplicity of anode elements 704*a*, 704*b*, 704*c*. In the embodiment shown in FIG. 7, the cathode contact 702 and anode elements 704*a*, 704*b*, 704*c* have a polygonal shape. For example, the cathode contact 702 has a generally square shape, and each of the anode elements 704*a*, 704*b*, 704*c* has a generally rectangular shape. It is understood that a charging interface can include cathode and anode contact elements having the same or different curvilinear or polygonal shape.

Figure 8A:
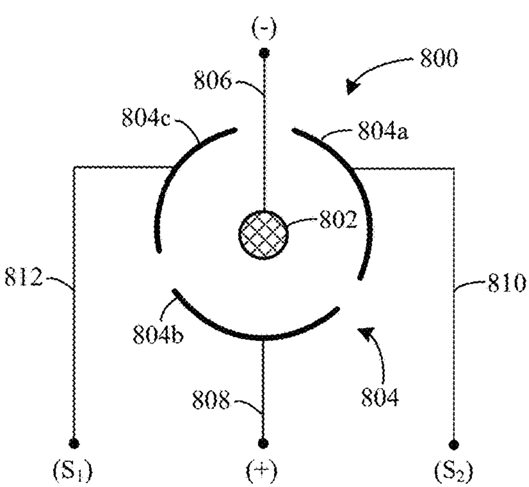
FIG. 8A illustrates a charging interface of one or both of an ear-worn electronic device and a charging module in accordance with any of the embodiments disclosed herein.

FIG. 8A illustrates a charging interface in accordance with any of the embodiments disclosed herein. The charging interface 800 shown in FIG. 8A includes a cathode contact 802, which is typically coupled to a negative contact charging connection 806. The charging interface 800 also includes an anode contact 804, which comprising a contact element typically coupled to a positive contact charging connection 808. In the embodiment shown in FIG. 8A, the anode contact 804 has a concentric tri-trace anode configuration comprising a multiplicity of electrode elements 804*a*, 804*b*, 804*c*. As shown, the cathode contact 802 is surrounded by the concentric tri-trace anode 804 comprising individual arcuate electrode elements 804*a*, 804*b*, 804*c*. The arcuate electrode elements 804*a*, 804*b*, 804*c* are situated at substantially the same radius relative to the cathode contact 802. Although three arcuate electrode elements are shown in FIG. 8A, the concentric anode 804 can comprise two, four, five or more electrode elements, for example.

According to various embodiments, a hearing device and a charging module incorporate the charging interface 800 shown in FIG. 8A. Each of the electrode elements of the anode contact 804 is coupled to a separate electrical connection. More particularly, electrode element 804*a* is coupled to connection 810, electrode element 804*b* is coupled to connection 808, and electrode element 804*c* is coupled to connection 812. Electrode element 804*b* represents an anode contact of the charging interface 800. The electrode element 804*b* and the cathode contact 802 are configured to communicate power produced by the charging module when charging the rechargeable power source of the hearing device. Disparate information signals (e.g., signals $S_1$ and $S_2$) can be communicated between the hearing device and the charging module via electrode elements 804*a*, 804*c* and connections 810, 812. For example, signals $S_1$ can constitute data signals (e.g., state of charge and charging status data signals) and signals $S_2$ can constitute control signals generated by the charging module and/or the hearing device.

Figures 11, 12:
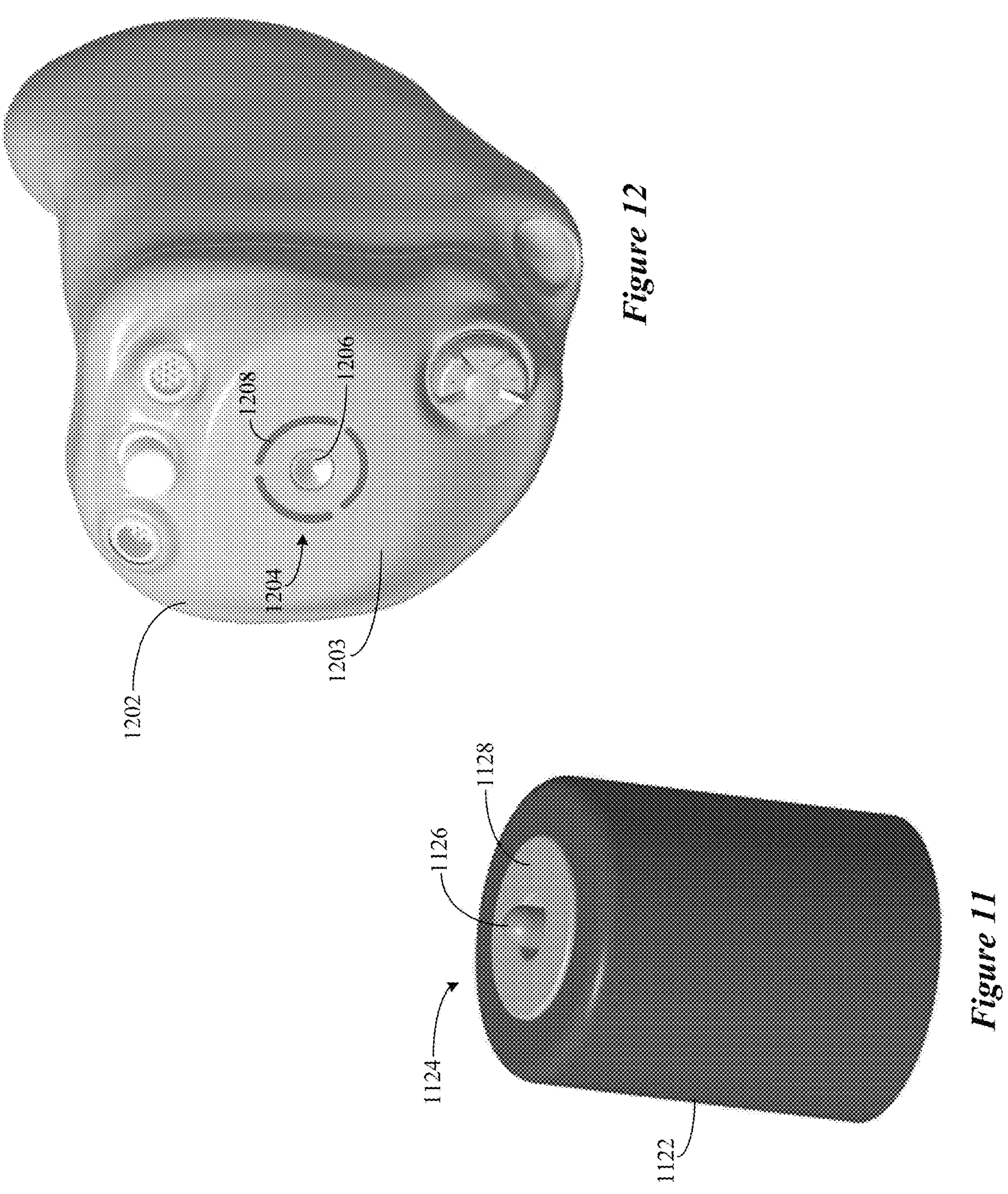
FIG. 11 illustrates a system comprising an ear-worn electronic device and a charging module respectively incorporating charging circuitry and functionality in accordance with any of the embodiments disclosed herein.
FIG. 12 illustrates a system comprising an ear-worn electronic device and a charging module respectively incorporating charging circuitry and functionality in accordance with any of the embodiments disclosed herein.

When implemented on a hearing device, and in accordance with some embodiments, a region of the cathode contact 802 (e.g., central region) can be recessed relative to a contact surface of the anode contact 804 (see, e.g., FIGS. 9 and 12). Alternatively, the cathode contact 802 and the anode contact 804 can be substantially coplanar. When implemented on a charging module, and in accordance with some embodiments, the cathode contact 802 is a fixed electrical element (non-displaceable) and need not be proud relative to a contact surface of the anode contact 804. In accordance with other embodiments, the cathode contact 802 can be displaceable (see, e.g., FIGS. 10 and 11) and proud relative to a contact surface of the anode contact 804. Although shown as having a generally circular or arcuate shape, the cathode and anode contacts 802, 804 can have any curvilinear or polygonal shape.

Figure 8B:
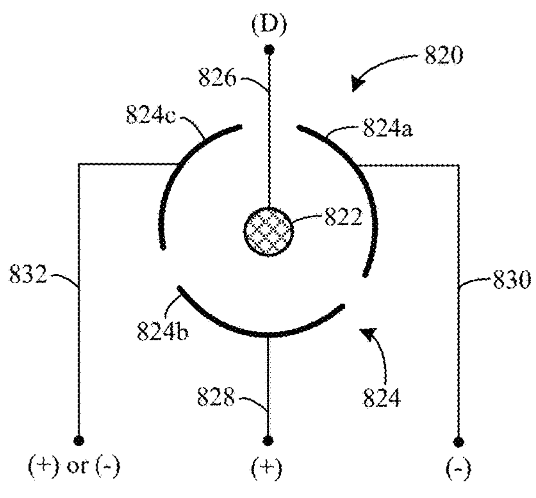
FIG. 8B illustrates a charging interface of one or both of an ear-worn electronic device and a charging module in accordance with any of the embodiments disclosed herein.
Figures 8F, 8G, 8H, 8I:
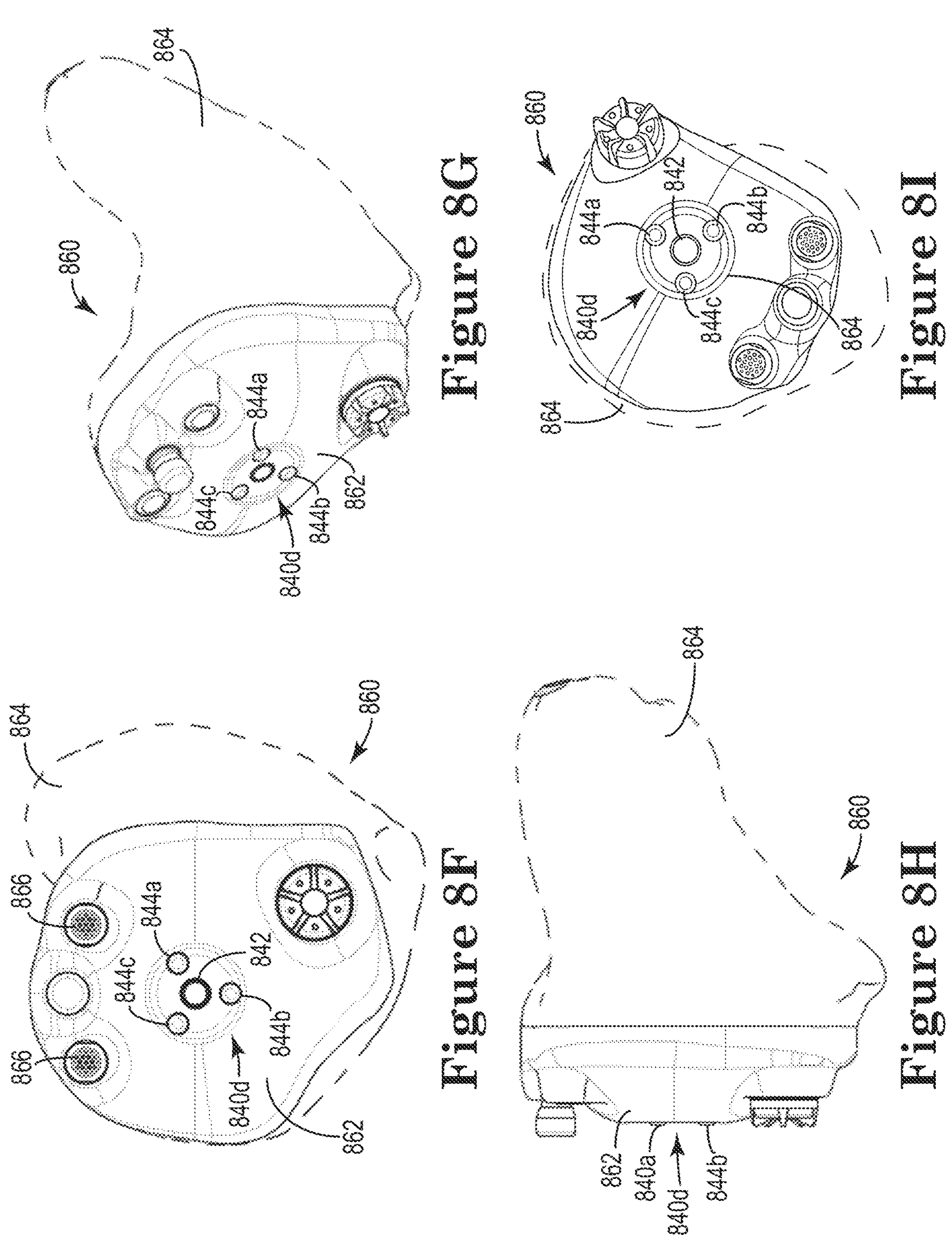
FIGS. 8F-8I illustrate a charging interface of an ear-worn electronic device in accordance with any of the embodiments disclosed herein.

FIG. 8B illustrates a charging interface in accordance with any of the embodiments disclosed herein. The charging interface 820 shown in FIG. 8B includes an arrangement of electrodes 824 comprising at least one cathode contact 824*a* and at least one anode contact 824*b*. The electrode arrangement 824 can include additional electrodes, such as electrode 824*c*, which can be a cathode contact or an anode contact. It is understood that the electrodes of the arrangement 824 can be configured as cathode or anode contacts, as long as the arrangement of electrodes 824 includes at least one cathode contact and at least one anode contact. A data contact 822 is shown surrounded by electrodes of the electrode arrangement 824. In the representative embodiment shown in FIG. 8B, the electrode arrangement 824 has a concentric tri-trace electrode configuration comprising contacts 824*a*, 824*b*, 824*c*, which surround data contact 822. In some embodiments, the electrode arrangement 824 includes two arcuate electrodes, such as cathode contact 824*a* and anode contact 824*b*, which can be spaced apart from one another in the manner shown in FIG. 14D, for example. The arcuate electrode elements 824*a*, 824*b*, 824*c* are situated at substantially the same radius relative to the data contact 822. Although three arcuate electrode elements are shown in FIG. 8B, the electrode arrangement 824 can comprise two, four, five or more electrode elements, for example.

According to various embodiments, a hearing device and a charging module incorporate the charging interface 820 shown in FIG. 8B. Cathode contact 824*a* is typically coupled to a negative contact charging connection 830, and anode contact 824*b* is typically coupled to a positive contact charging connection 828. Electrical contact 824*c* can be coupled to either a negative or a positive charging connection 832. The electrode arrangement 824 is configured to communicate power produced by the charging module when charging the rechargeable power source of the hearing device. One or more information signals can be communicated between the hearing device and the charging module via data contact 822 via signal connection 826. For example, these information signals can constitute data signals (e.g., state of charge and charging status data signals) and control signals generated by the charging module and/or the hearing device.

FIG. 8C illustrates a charging interface in accordance with any of the embodiments disclosed herein. The charging interface 840*a* shown in FIG. 8C includes a cathode contact 842, which is typically coupled to a negative contact charging connection 846. The charging interface 840*a* also includes an anode contact 844, which is typically coupled to a positive contact charging connection 848. In the embodiment shown in FIG. 8C, the anode contact 844 comprises a multiplicity of electrode elements 844*a*, 844*b*, 844*c*, each of which is coupled to connection 848. The anode contact 844 has a triangular configuration, and is arranged to surround the cathode contact 842. The triangular anode contact 844 includes three electrode elements 844*a*, 844*b*, 844*c* each having a generally curvilinear shape. In some embodiments, the electrode elements 844*a*, 844*b*, 844*c* have a closed curved shape comprising only curved lines (e.g., no line segments). For example, the electrode elements 844*a*, 844*b*, 844*c* can have a non-polygonal shape (e.g., a geometric shape that does not conform to the definition of a polygon). Representative examples of electrode elements 844*a*, 844*b*, 844*c* having a generally curvilinear shape include those having a generally round (e.g., circular) shape, an elliptical shape, and an oval shape. It is understood that the electrode elements 844*a*, 844*b*, 844*c* can also have an arbitrary closed curvilinear shape (e.g., a meandering shape) and/or a closed curvilinear shape comprising predominately curved lines (e.g., a minor percentage (≤10-20%) of line segments).

The electrode elements 844*a*, 844*b*, 844*c* can be situated at substantially the same distance (e.g., ~2-6 mm, ~4-5 mm, ~3-5 mm) relative to the cathode contact 842. The cathode contact 842 can have a diameter of about 1.5 mm to about 3 mm, and the electrode elements 844*a*, 844*b*, 844*c* can have the same or smaller diameter (e.g., about 1 mm to about 2.5 mm). Although three electrode elements 844*a*, 844*b*, 844*c* are shown in FIG. 8C, the anode contact 844 can comprise one, two, four, five or more electrode elements, for example, arranged in a substantially triangular shape. Also, although the electrode elements 842, 844*a*, 844*b*, 844*c* are shown having the same general shape in FIG. 8C (and other figures), it is understood that the electrode elements 842, 844*a*, 844*b*, 844*c* can have different shapes. For example, the electrode elements 842, 844*a*, 844*b*, 844*c* can have different curvilinear shapes or any combination of generally curvilinear shapes and generally rectilinear shapes.

When implemented on a hearing device, and in accordance with some embodiments, a region of the cathode contact 842 (e.g., central region) can be recessed relative to a contact surface of the anode contact 844 (see, e.g., FIGS. 9 and 12). Alternatively, the cathode contact 842 and the anode contact 844 can be substantially coplanar. When implemented on a charging module, and in accordance with some embodiments, the cathode contact 842 is a fixed electrical element (non-displaceable) and need not be proud relative to a contact surface of the anode contact 844. In accordance with other embodiments, the cathode contact 842 can be displaceable (see, e.g., FIGS. 10 and 11) and proud relative to a contact surface of the anode contact 844.

FIG. 8D illustrates a charging interface in accordance with any of the embodiments disclosed herein. The charging interface 840*b* shown in FIG. 8D includes a cathode contact 842, which is typically coupled to a negative contact charging connection 846. The charging interface 840*b* also includes an anode contact 844, which is typically coupled to a positive contact charging connection 848. In the embodiment shown in FIG. 8D, the anode contact 844 has a triangular anode configuration comprising a multiplicity of electrode elements 844*a*, 844*b*, 844*c*. As shown, the cathode contact 842 is surrounded by the triangular anode 844 comprising individual electrode elements 844*a*, 844*b*, 844*c*. The electrode elements 844*a*, 844*b*, 844*c* are situated at substantially the same distance relative to the cathode contact 842. Although three electrode elements 844*a*, 844*b*, 844*c* are shown in FIG. 8D, the anode contact 844 can comprise one, two, four, five or more electrode elements, for example, arranged in a generally triangular shape. The electrode elements 842, 844*a*, 844*b*, 844*c* can have a generally curvilinear shape or other shapes and/or combination of shapes discussed above with reference to FIG. 8C.

According to various embodiments, a hearing device and a charging module can incorporate the charging interface 840*b* shown in FIG. 8D. Each of the electrode elements of the anode contact 844 is coupled to a separate electrical connection. More particularly, electrode element 844*a* is coupled to connection 850, electrode element 844*b* is coupled to connection 848, and electrode element 844*c* is coupled to connection 852. Electrode element 844*b* represents an anode contact of the charging interface 840*b*. The electrode element 844*b* and the cathode contact 842 are configured to communicate power produced by the charging module when charging the rechargeable power source of the hearing device. Disparate information signals (e.g., signals $S_1$ and $S_2$) can be communicated between the hearing device and the charging module via electrode elements 844*a*, 844*c* and connections 850, 852. For example, signals $S_1$ can constitute data signals (e.g., state of charge and charging status data signals) and signals $S_2$ can constitute control signals generated by the charging module and/or the hearing device.

FIG. 8E illustrates a charging interface in accordance with any of the embodiments disclosed herein. The charging interface 840*c* shown in FIG. 8E includes an arrangement of electrodes 844 comprising at least one cathode contact 844*a* and at least one anode contact 844*b*. The electrode arrangement 844 can include additional electrodes, such as electrode 844*c*, which can be a cathode contact or an anode contact. It is understood that any of the electrodes of the arrangement 844 can be configured as cathode or anode contacts, as long as the arrangement of electrodes 844 includes at least one cathode contact and at least one anode contact. A data contact 842 is shown surrounded by electrodes of the electrode arrangement 844. The electrode elements 842, 844*a*, 844*b*, 844*c* can have a generally curvilinear shape or other shapes and/or combination of shapes discussed above with reference to FIG. 8C.

In the representative embodiment shown in FIG. 8E, the electrode arrangement 844 has a generally triangular configuration comprising contacts 844*a*, 844*b*, 844*c*, which surround data contact 842. In some embodiments, the electrode arrangement 844 can include two electrodes, such as cathode contact 844*a* and anode contact 844*b*, which are shaped to generally form a triangular pattern and can be spaced apart (e.g., equidistantly) from the data contact 842. The electrode elements 844*a*, 844*b*, 844*c* can be situated at substantially the same distance relative to the data contact 842. Although three curvilinear shaped electrode elements 844*a*, 844*b*, 844*c* are shown surrounding the central data contact 842 in FIG. 8E, the electrode arrangement 844 can comprise one, two, four, five or more curvilinear shaped electrode elements that having a generally triangular pattern and surround the data contact 842.

According to various embodiments, a hearing device and a charging module can incorporate the charging interface 840*c* shown in FIG. 8E. Cathode contact 844*a* is typically coupled to a negative contact charging connection 850, and anode contact 844*b* is typically coupled to a positive contact charging connection 848. Electrical contact 844*c* can be coupled to either a negative or a positive charging connection 852. The electrode arrangement 844 is configured to communicate power produced by the charging module when charging the rechargeable power source of the hearing device. One or more information signals can be communicated between the hearing device and the charging module via data contact 842 and signal connection 846. For example, these information signals can constitute data signals (e.g., state of charge and charging status data signals) and control signals generated by the charging module and/or the hearing device.

When implemented on a hearing device, and in accordance with either of the embodiments shown in FIGS. 8D and 8E, a region of the central contact 842 (e.g., central region) can be recessed relative to a contact surface of the peripheral contacts 844*a*, 844*b*, 844*c* (see, e.g., FIGS. 9 and 12). Alternatively, the central contact 842 and the peripheral contacts 844*a*, 844*b*, 844*c* can be substantially coplanar. In accordance with either of the embodiments shown in FIGS. 8D and 8E (and other embodiments shown in other figures), when implemented on a hearing device, a region of the central contact 842 (e.g., central region) can be elevated relative to a contact surface of the peripheral contacts 844*a*, 844*b*, 844*c*.

FIGS. 8F-8I illustrate a custom hearing device (e.g., a custom hearing aid) in accordance with any of the embodiments disclosed herein. The hearing device 860 shown in FIGS. 8F-8I is configured to be worn at least partially within the ear canal of a wearer's ear. The hearing device 860 is representative of any type of ITE hearing aid, such as an ITC, IIC or CIC hearing aid, for example. The hearing device 860 includes a faceplate 862 and a shell 864 connected to the shell 864. The shell 864 houses the electronic and electrical components of the hearing device 860, such as those previously described. The shell 864 is typically shaped to conform to a particular wearer's ear canal using a mold taken from the wearer's ear. In some configurations, the shell 864 can be constructed from semi-soft material (e.g., polymeric material) which can conform to the shape of the wearer's ear canal when the shell 864 is inserted therein. The faceplate 862 includes a charging interface 840*d* and other components/structures of the hearing device 860, such as one or two microphones 866.

The charging interface 840*d* disposed on the faceplate 862 comprises a central contact 842 surrounded by three peripheral contacts 844*a*, 844*b*, 844*c* arranged in a substantially triangular pattern. The peripheral contacts 844*a*, 844*b*, 844*c* can be situated at substantially the same distance (e.g., ~2-5 mm, ~4-5 mm, ~3-4 mm) relative to the central contact 842. The central contact 842 can have a diameter of about 2 mm to about 3 mm, and the peripheral contacts 844*a*, 844*b*, 844*c* can have the same or smaller diameter (e.g., about 1 mm to about 2.5 mm, ~1.5-2 mm).

The charging interface 840*d* can be representative of any of the charging interfaces discussed herein. For example, charging interface 840*d* can be configured and wired in the manner of charging interface 840*a* shown in FIG. 8C. In this representative configuration, the charging interface 840*d* includes a central cathode contact 842, coupled to a negative charging connection, and three anode contacts 844*a*, 844*b*, 844*c*, each coupled to a positive charging connection. The anode contacts 844*a*, 844*b*, 844*c* are arranged in a substantially triangular pattern and surround the cathode contact 842. The contacts 842, 844*a*, 844*b*, 844*c* can have a generally curvilinear shape or other shapes and/or combination of shapes discussed above with reference to FIG. 8C.

According to another example embodiment, the charging interface 840*d* can be configured and wired in the manner of charging interface 840*b* shown in FIG. 8D. In this representative configuration, central contact 842 is configured as a cathode contact and peripheral contact 844*b* is an anode contact of the charging interface 840*d*. Central cathode contact 842 and peripheral anode contact 844*b* are configured to communicate power produced by a charging module when charging the rechargeable power source of the hearing device 860. Disparate information signals (e.g., signals $S_1$ and $S_2$) can be communicated between the hearing device 860 and the charging module via peripheral contacts 844*a*, 844*c*. For example, signals $S_1$ can constitute data signals (e.g., state of charge and charging status data signals) and signals $S_2$ can constitute control signals generated by the charging module and/or the hearing device 860.

According to another example embodiment, the charging interface 840*d* can be configured and wired in the manner of charging interface 840*c* shown in FIG. 8E. In this representative configuration, the charging interface 840*d* includes at least one cathode contact 844*a* and at least one anode contact 844*b*. Electrode 844*c* can be configured as a cathode contact or an anode contact (or a separate signal communicating contact). A central data contact 842 can be surrounded by contacts 844*a*, 844*b*, 844*c* arranged in a substantially triangular pattern. The contacts 842, 844*a*, 844*b*, 844*c* can have a generally curvilinear shape or other shapes and/or combination of shapes discussed above with reference to FIG. 8C.

In accordance with any of the embodiments shown in FIGS. 8F-8I, a region of the charging interface 840*d* which includes the central contact 842 (e.g., central region) can be recessed relative to a contact surface of the peripheral contacts 844*a*, 844*b*, 844*c* (see, e.g., FIGS. 9 and 12). Alternatively, the central contact 842 and the peripheral contacts 844*a*, 844*b*, 844*c* can be substantially coplanar. In accordance with alternative embodiments, the central region of the charging interface 840*d* which includes the central contact 842 can be elevated relative to a contact surface of the peripheral contacts 844*a*, 844*b*, 844*c*. In accordance with any of the embodiments disclosed herein, the peripheral contacts 844*a*, 844*b*, 844*c* can be surrounded by a peripheral wall having a height greater than that of an exposed surface of peripheral contacts 844*a*, 844*b*, 844*c*.

Figure 8K:
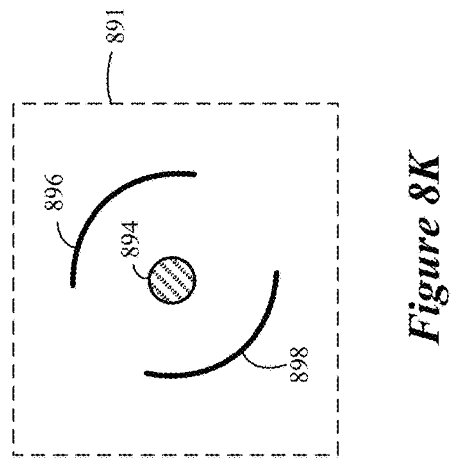
FIG. 8K illustrates a charging interface of a charging module comprising a central data pin surrounded by a pair of arcuate contacts in accordance with any of the embodiments disclosed herein.
Figure 8J:
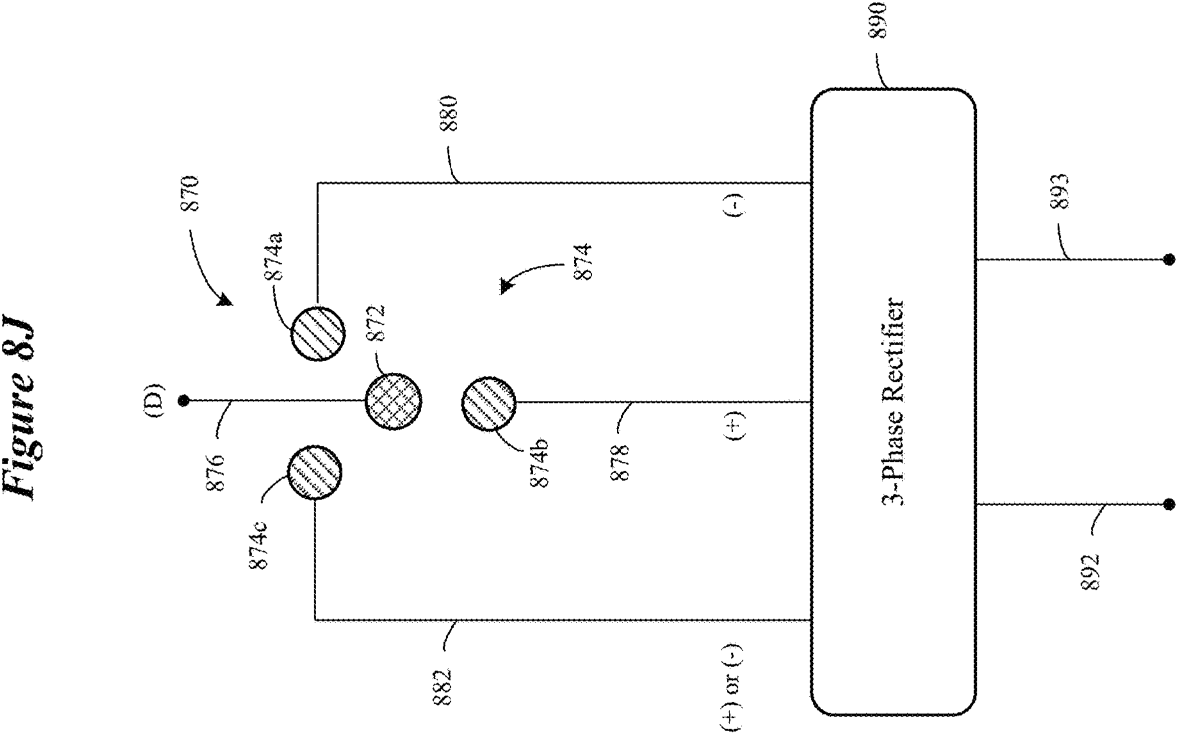
FIG. 8J illustrates a charging interface of a hearing device comprising a central data contact surrounded by a triangular arrangement of curvilinear-shaped peripheral contacts coupled to a multi-phase rectifier in accordance with any of the embodiments disclosed herein.

FIG. 8J illustrates a charging interface of a hearing device in accordance with any of the embodiments disclosed herein. The charging interface 870 shown in FIG. 8J includes an arrangement of peripheral electrodes 874 comprising at least one cathode contact **874*a* and at least one anode contact 874*b*. The peripheral electrode arrangement 874 can include additional electrodes, such as electrode 874*c*, which can be an anode contact or a cathode contact. A data contact 872 is shown surrounded by electrodes of the electrode arrangement 874. In the representative embodiment shown in FIG. 8J, each of the peripheral electrodes 874*a*, 874*b*, 874*c* and the data contact 872** has a generally curvilinear shape (e.g., rounded, circular, elliptical, oval).

The charging interface 870 is coupled to poly-phase rectification circuitry disposed in the housing of the hearing device, which is illustrated as a 3-phase rectifier 890 in FIG. 8J. Contacts **874*a*, 874*b*, and 874*c* are coupled to the 3-phase rectifier 890 via charging connections 880, 878, and 882, respectively. The electrode arrangement 874 is configured to communicate power produced by the charging module when charging the rechargeable power source of the hearing device. In the embodiment shown in FIG. 8J, power is contained within the concentric electrode arrangement 874. Using this electrode configuration, if at least one contact of the electrode arrangement 874 is connected to ground (GND) and at least one other contact of the electrode arrangement 874 is connected to power (PWR), then the 3-phase rectifier 890** will supply the correct polarity with the correct voltage.

The charging interface 870 of the hearing device is configured to establish electrical connection with a charging interface 891 of a charging module, an example of which is shown in FIG. 8K. The charging interface 870 of the hearing device includes at least two contacts **874*a*, 874*b* which serve as cathode and anode contacts. The two contacts 896, 898 of the charging module's charging interface 891 are configured and arranged so that each contact 896, 898 electrically connects with only one of the three contacts 874*a*, 874*b*, 874*c* of the hearing device's charging interface 870. This arrangement ensures that anode and cathode contacts of the hearing device electrically connect with respective anode and cathode contacts of the charging module. In FIG. 8K, the contacts 896, 898 of the charging module's charging interface 891 are shown as having an arcuate shape. The contacts 896, 898** may alternatively have a curvilinear shape, a rectilinear shape, or other shape.

One or more information signals can be communicated between the hearing device and the charging module via data contact 872 and signal connection 876. For example, these information signals can constitute data signals (e.g., state of charge and charging status data signals) and control signals generated by the charging module and/or the hearing device. One or more disparate signals can be communicated over data contact 872 using a sequential or multiplexing data transmission technique (e.g., time-division multiplexing, frequency-division multiplexing, code-division multiplexing).

FIG. 9 is a cross-sectional view of a portion of a hearing device in accordance with any of the embodiments disclosed herein. The portion of the hearing device 900 shown in FIG. 9 includes a charging interface 902 incorporated on the shell or housing 904 of the hearing device 900. The charging interface 902 is situated at or near an exterior surface of the housing 904. For example, the charging interface 902 can be situated on a faceplate of an in-the-car type hearing device (e.g., ITE, ITC, IIC, CIC device). In the case of an on-the-car type hearing device (e.g., BTE, RIC, RITE device), for example, the charging interface 902 can be situated at or near a bottom or top end surface of the housing 902. The charging interface 902 is configured to physically and electrically coupled to a corresponding charging interface of a charging module (see, e.g., FIGS. 3, 4, 10, and 11).

The charging interface 902 includes a cathode contact 906 partially or entirely surrounded by an anode contact 908. The anode contact 908 can be a single electrical contact or comprise a multiplicity of electrical contacts (see, e.g., FIGS. 3-8). For example, the anode contact 908 can comprise a single annular electrical contact or two or more arcuate electrical contacts (e.g., a concentric tri-trace anode configuration). The cathode contact 906 is shown extending slightly beyond the exterior surface of the housing 904 relative to the anode contact 908, which is shown as substantially coplanar with the exterior surface of the housing 904. In some implementations, the cathode contact 906 can be substantially coplanar with exterior surface of the housing 904. The cathode contact 906 can include a recessed region 907, which is typically situated within a central region of the cathode contact 906. The recessed region 907 serves to guide a corresponding cathode contact of a charging module into proper contact with the cathode contact 906.

In the embodiment shown in FIG. 9, the hearing device 900 includes a retention arrangement 910. The retention arrangement 910 is configured to maintain engagement between the charging interface 902 and a corresponding charging interface of a charging module during charging of a rechargeable power source of the hearing device 900. The retention arrangement 910 includes a magnet 911 or magnetizable structure which can interact with a corresponding magnet or magnetizable structure of the charging module. In some embodiments, the anode contact 908 partially or entirely comprises magnetic material, in which case the separate magnet 911 or magnetizable structure need not be included in the retention arrangement 910.

FIG. 10 is a cross-sectional view of a portion of a charging module in accordance with any of the embodiments disclosed herein. The portion of the charging module 1000 shown in FIG. 10 includes a charging interface 1002 disposed on a charging surface 1004 of the charging module 1000. The charging interface 1002 is configured to physically and electrically coupled to a corresponding charging interface of a hearing device (see, e.g., FIGS. 3, 4, 9, and 12). The charging interface 1002 includes a cathode contact 1006 partially or entirely surrounded by an anode contact 1008. The anode contact 1008 can be a single electrical contact or comprise a multiplicity of electrical contacts (see, e.g., FIGS. 3-8). For example, the anode contact 1008 can comprise a single annular electrical contact or two or more arcuate electrical contacts (e.g., a concentric tri-trace anode configuration).

The charging interface 1002 includes a through-hole 1012 within which the cathode contact 1006 is disposed. The cathode contact 1006 is displaceable within the through-hole 1012. A biasing arrangement 1014 is configured to bias at least a portion **1006*a* of the cathode contact 1006 above a contact surface 1009 of the anode contact 1008. As such, the cathode contact 1006 is proud relative to the anode contact 1008 prior to engagement with a corresponding charging interface of a hearing device. The biasing arrangement 1014 is configured to bias at least the portion 1006*a* of the cathode contact 1006 above the contact surface 1009 to facilitate electrical contact between the cathode contact 1006 and a corresponding cathode contact of a hearing device prior to electrical contact between the anode contact 1008** and corresponding anode contact of the hearing device.

According to some embodiments, the cathode contact 1006 comprises an elongated electrode, and the biasing arrangement 1014 comprises a spring 1016. In some embodiments, the cathode contact 1006 and biasing arrangement 1014 define a spring-loaded pogo pin assembly. The pogo pin assembly 1014 includes a center post pogo pin 1006 which is seated into the housing of the charging module 1000 via pogo housing 1018. The pogo housing 1018 contains a pogo spring 1016 and a pogo endstop 1019.

The charging module 1000 also includes a retention arrangement 1020 configured to maintain engagement between the charging interface 1002 and a corresponding charging interface of a hearing device during charging of a rechargeable power source of the hearing device. The retention arrangement 1020 includes a magnet 1022 or magnetizable structure which can interact with a corresponding magnet or magnetizable structure of the hearing device. In some embodiments, the anode contact 1008 partially or entirely comprises magnetic material, in which case the separate magnet 1022 or magnetizable structure need not be included in the retention arrangement 1020. In some embodiments, the anode contact 1008 can be implemented as a ring magnet plated with electrically conductive material. The ring magnet provides attraction to a different magnet or magnetizable structure in the hearing device in order to align the electrical contacts. The plating provides corrosion resistance.

FIGS. 11 and 12 illustrate a system in accordance with any of the embodiments disclosed herein. The system includes a hearing aid 1202 (FIG. 12) configured to be worn at least partially within the ear canal of a wearer's ear. The hearing aid 1202 is representative of any type of ITE hearing aid, such as an ITC, IIC or CIC hearing aid, for example. The hearing aid 1202 includes a charging interface 1204 comprising a cathode contact 1206 surrounded by an anode contact 1208. Although shown as a concentric tri-trace anode in FIG. 12, the anode contact 1208 can be configured as a single electrode element or a multiplicity of electrode elements. The charging interface 1204 is disposed on a faceplate 1203 of the hearing aid 1202.

FIG. 11 shows a charging module 1122 which can be installed in, or be integral to, a charging fixture. The charging module 1122 includes a charging interface 1124 which includes a displaceable central cathode contact 1126 surrounded by a concentric anode contact 1128. The displaceable central cathode contact 1126 can be implemented as a spring-loaded elongated electrode, such as that shown in FIG. 10 (e.g., a spring-loaded pogo pin assembly). It is understood that a charging fixture will typically include two of the charging modules 1122 configured to charge two of the hearing aids 1202.

Figure 13:
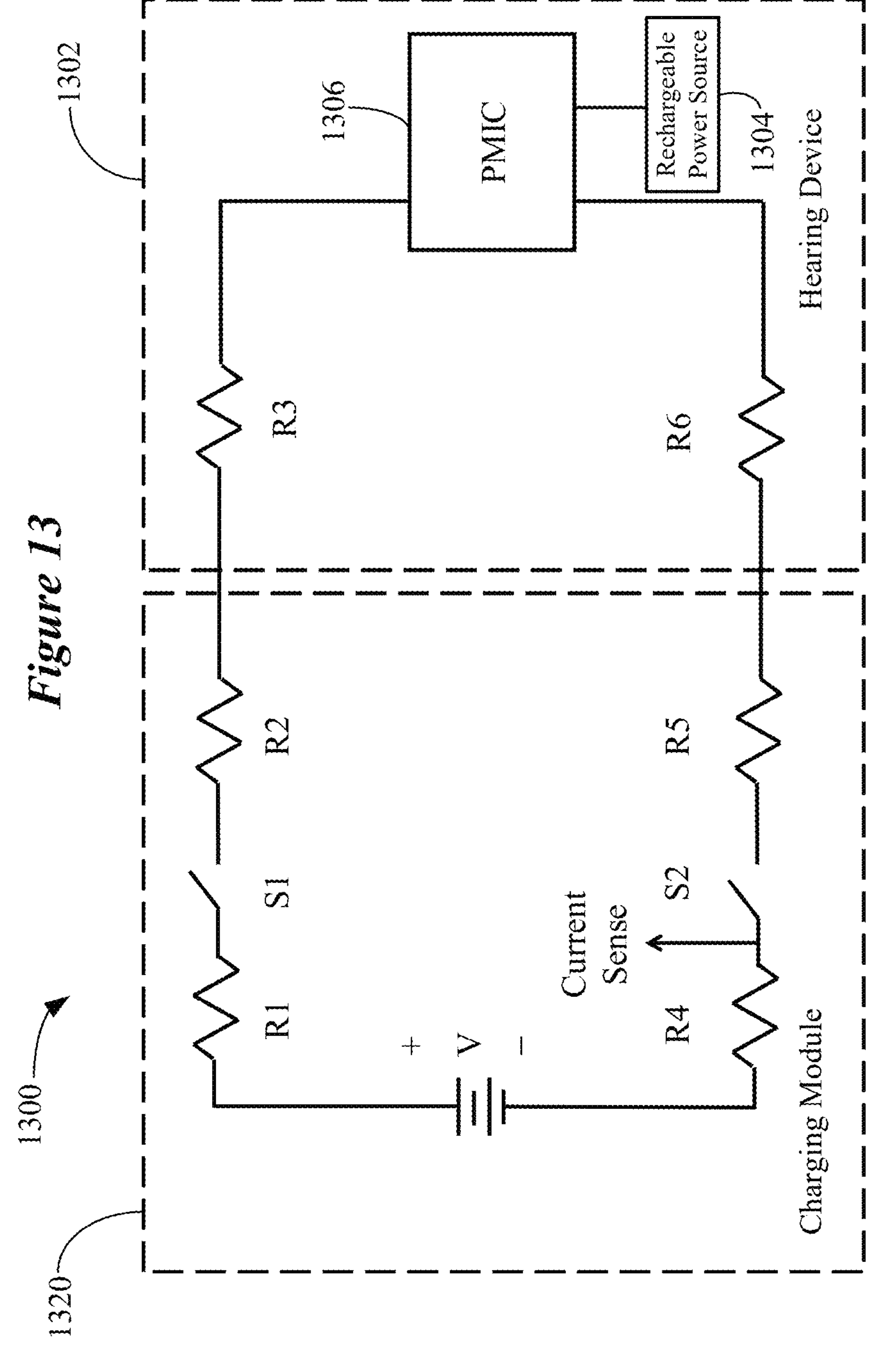
FIG. 13 is a schematic showing electrical components of a system comprising an ear-worn electronic device and a charging module respectively incorporating charging circuitry and functionality in accordance with any of the embodiments disclosed herein.

FIG. 13 is a schematic showing electrical components of a system in accordance with any of the embodiments disclosed herein. The schematic of system 1300 includes electrical components of a hearing device 1302 and electrical components of a charging module 1320. The hearing device 1302 includes a rechargeable power source 1304, such as a lithium-ion battery. The rechargeable power source 1304 is coupled to power management circuitry 1306, such as a PMIC. The power management circuitry 1306 is coupled to an anode contact R3 and a cathode contact R6. The anode contact R3 and cathode contact R6 of the hearing device 1302 can have a configuration and functionality described previously.

The charging module 1320 includes a power source V, which is represented as a battery in FIG. 13. The power source V can include a rechargeable battery, a conventional battery, and/or an AC/DC converter configured to receive power from a standard wall outlet. In some embodiments, the power source V can be configured to receive wireless power from an external power source (e.g., Qi, inductive, radiofrequency, optical). The charging module impedance is represented by R1, which is shown coupled to an anode contact R2 via anode switch S1. Resistor R4 represents a pulldown resistor for current sensing. Resistor R4 is coupled to a cathode contact R5 via cathode switch S2. The anode contact R2 and cathode contact R5 of the charging module 1320 can have a configuration and functionality described previously. In some embodiments, the charging module 1320 is not configured to control anode switch S1 and cathode switch S2 independently, so mechanically ensuring a ground (GND) contact first provides for a more accurate and consistent inrush current profile as previously discussed.

Figure 14A:
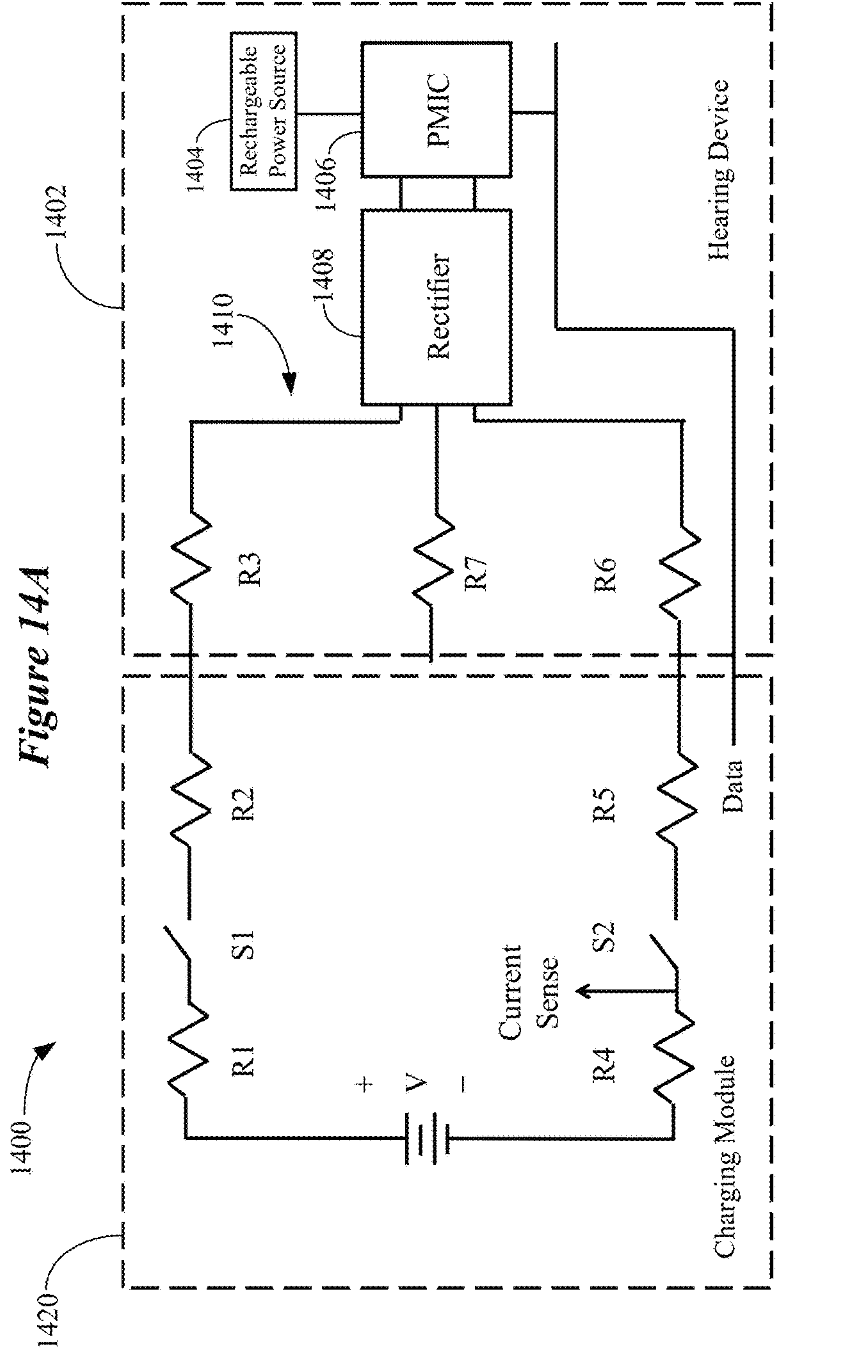
FIG. 14A is a schematic showing electrical components of a system comprising an ear-worn electronic device and a charging module respectively incorporating charging circuitry and functionality in accordance with any of the embodiments disclosed herein.

FIG. 14A is a schematic showing electrical components of a system in accordance with any of the embodiments disclosed herein. The schematic of system 1400 includes electrical components of a hearing device 1402 and electrical components of a charging module 1420. The hearing device 1402 includes a rechargeable power source 1404, such as a lithium-ion battery. The rechargeable power source 1404 is coupled to power management circuitry 1406, such as a PMIC. The power management circuitry 1406 is coupled to a rectifier 1408. The rectifier 1408 is coupled to a contact arrangement 1410 comprising a cathode contact, at least one anode contact, and one or more electrical contacts configured to communicate information signals between the hearing device 1402 and the charging module 1420. The rectifier 1408 can be implemented as an N-phase rectifier, where N is equal to the number of electrical contacts of the contact arrangement 1410.

Figure 14B:
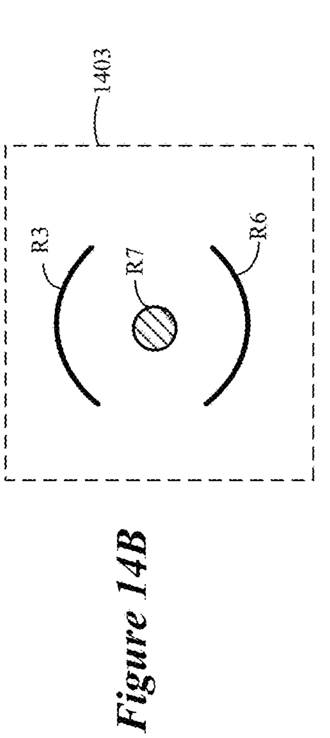
FIG. 14B illustrates a charging interface of a hearing device comprising a central cathode pin surrounded by split-ring pin connectors in accordance with any of the embodiments disclosed herein.

Any of contacts R3, R6, and R7 of the hearing device 1402 can be configured as an anode contact or a cathode contact. Any of contacts R3, R6, and R7 can be configured as an electrical contact configured to communicate information signals. In some embodiments, contacts R3, R6, and R7 can be configured as split-ring pin connectors, with the center pin connector being used for data signal transmission and the other two connectors being used as cathode and anode contacts for charging. Other electrical contact configurations are contemplated. For example, and with reference to the embodiment shown in FIG. 14B, the hearing device 1402 can include a charging interface 1403 comprising a central cathode pin R7 surrounded by split-ring pin connectors R3 and R6. One of connectors R3 and R6 is configured as an anode contact for charging, and the other of connectors R3 and R6 is configured as an electrical contact configured for data signal transmission. The contact arrangement 1410 of the hearing device 1402 can have a configuration and functionality described previously.

The charging module 1420 includes a power source V, which is represented as a battery in FIG. 14. The power source V can include a rechargeable battery, a conventional battery, and/or an AC/DC converter configured to receive power from a standard wall outlet. In some embodiments, the power source V can be configured to receive wireless power from an external power source (e.g., Qi, inductive, radiofrequency, optical). The charging module impedance is represented by R1, which is shown coupled to an anode contact R2 via anode switch S1. Resistor R4 represents a pulldown resistor for current sensing. Resistor R4 is coupled to a cathode contact R5 via cathode switch S2. The anode contact R2 and cathode contact R5 of the charging module 1420 can have a configuration and functionality described previously. In some embodiments, the charging module 1420 is not configured to control anode switch S1 and cathode switch S2 independently, so mechanically ensuring a ground (GND) contact first provides for a more accurate inrush current profile as previously discussed.

In addition to providing anode and cathode contacts for charging, the hearing device 1402 and charging module 1420 include one or more additional electrical contacts for communicating information signals between the hearing device 1402 and charging module 1420. For example, data can be communicated via one or more contacts, which can be split into multiple contacts each providing a separate connection for disparate signal transmission. The type of signal transmitted over each contact can be detected automatically by the charging module 1420, which can reconfigure the charger connections in real time. For example, the charging module 1420 can include circuitry for detecting whether a particular contact is being used to transmit power and/or data, such as by detecting the pull-up strength of the contacts. In some embodiments, the charging module 1420 can include circuitry configured to detect the connections by cycling through known protocol possibilities and using the one that works through a handshaking procedure.

Figures 14C, 14D:
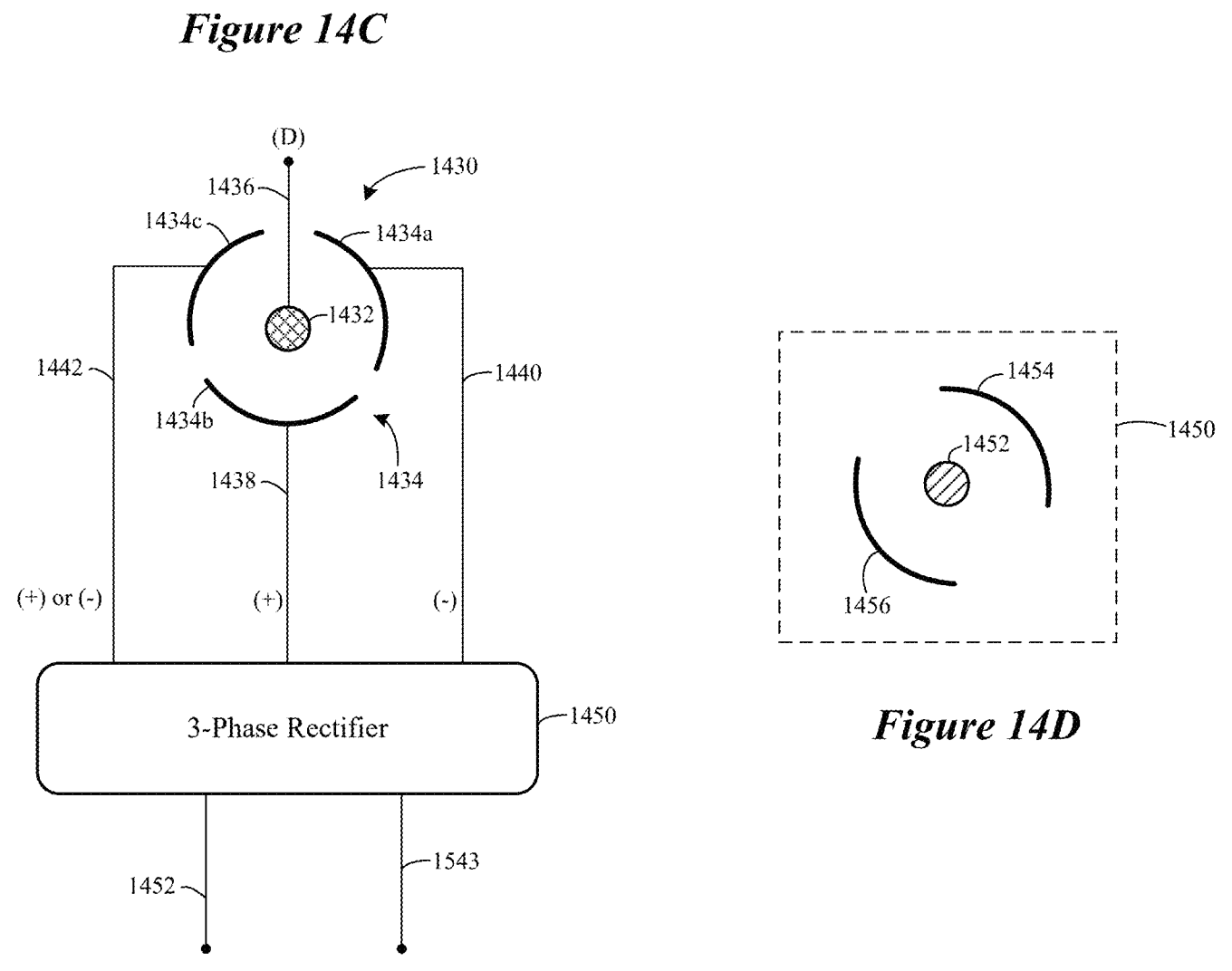

FIG. 14C illustrates a charging interface of a hearing device in accordance with any of the embodiments disclosed herein. The charging interface 1430 shown in FIG. 14C includes an arrangement of electrodes 1434 comprising at least one cathode contact 1434*a* and at least one anode contact 1434*b*. The electrode arrangement 1434 can include additional electrodes, such as electrode 1434*c*, which can be an anode contact or a cathode contact. A data contact 1432 is shown surrounded by electrodes of the electrode arrangement 1434. In the representative embodiment shown in FIG. 14C, the electrode arrangement 1434 has a concentric tri-trace electrode configuration comprising contacts 1434*a*, 1434*b*, 1434*c*, which surround data contact 1432. In some embodiments, the electrode arrangement 1434 includes two arcuate electrodes, such as cathode contact 1434*a* and anode contact 1434*b*, which can be spaced apart from one another (e.g., see FIG. 14D). The arcuate electrode elements 1434*a*, 1434*b*, 1434*c* are situated at substantially the same radius relative to the data contact 1432. Although three arcuate electrode elements are shown in FIG. 14C, the electrode arrangement 1434 can comprise two, four, five or more electrode elements, for example.

The charging interface 1430 is coupled to poly-phase rectification circuitry, which is illustrated as a 3-phase rectifier 1450 in FIG. 14C. Contacts 1434*a*, 1434*b*, and 1434*c* are coupled to the 3-phase rectifier 1450 via charging connections 1440, 1438, and 1442, respectively. The electrode arrangement 1434 is configured to communicate power produced by the charging module when charging the rechargeable power source of the hearing device. In the embodiments shown in FIG. 14C, power is contained within the concentric electrode arrangement 1434. Using this electrode configuration, if at least one contact of the electrode arrangement 1434 is connected to ground (GND) and at least one other contact of the electrode arrangement 1434 is connected to power (PWR), then the 3-phase rectifier 1450 will supply the correct polarity with the correct voltage.

The charging interface 1430 is configured to establish electrical connection with a charging interface of a charging module, an example of which is shown in FIG. 14D. The charging interface 1450 includes at least two contacts 1454, 1456 which serve as anode and cathode contacts. The two contacts 1454, 1456 of the charging module's charging interface 1450 are configured and arranged so that each contact 1454, 1456 electrically connects with only one of the three contacts 1434*a*, 1434*b*, 1434*c* of the hearing device's charging interface 1430. This arrangement ensures that anode and cathode contacts of the hearing device 1430 electrically connect with respective anode and cathode contacts of the charging module.

One or more information signals can be communicated between the hearing device and the charging module via data contact 1432 and signal connection 1436. For example, these information signals can constitute data signals (e.g., state of charge and charging status data signals) and control signals generated by the charging module and/or the hearing device. One or more disparate signals can be communicated over data contact 1432 using a sequential or multiplexing data transmission technique (e.g., time-division multiplexing, frequency-division multiplexing, code-division multiplexing).

FIG. 15 illustrates a method of implementing accelerated charging of one or more hearing devices using a charging module in accordance with any of the embodiments disclosed herein. In the illustrative method shown in FIG. 15, two car-worn electronic devices are subject to accelerated charging via two charging modules provided on the charging fixture. The method shown in FIG. 15 involves establishing connection 1502 between first and second car-worn electronic devices and first and second charging modules of the charging fixture. The method involves determining 1504 the state of charge (SoC) of the rechargeable power sources of the car-worn electronic devices. A check 1506 is made to determine if the SoC of the rechargeable power sources is within a predetermined SoC range (e.g., 5-35%). If the SoC of the rechargeable power sources fall within the predetermined SoC range, the method involves charging 1508 the rechargeable power sources at an accelerated charge rate above 1.0C (e.g., 1.5C-3.0C). Accelerated charging continues while the SoC of the rechargeable power sources remain within the predetermined SoC range. Accelerated charging is discontinued when the SoC of the rechargeable power sources is beyond the predetermined SoC range. In some embodiments, accelerated charging is discontinued in response to expiration of a predetermined time limit (e.g., 15 minutes), reaching a predetermined voltage limit (e.g., 4.1V), or reaching a predetermined energy limit (e.g., 7.5 mAh).

At the termination of accelerated charging, the ear-worn electronic devices may be removed from the charging modules of the charging fixture for immediate use. In some embodiments, five minutes of accelerated charging allows the car worn electronic devices to be used for between 2 and 6 hours of normal operation. Rather than using the car worn electronic devices after termination of accelerated charging, the method can involve charging 1510 the rechargeable power sources at a normal charge rate at or below 1.0 C. A check 1512 is made to determine if rechargeable power sources are fully charged. If not, charging at the normal charge rate continues. When the rechargeable power sources are fully charged, the charging procedure is terminated 1514. Accelerated charging can be implemented in accordance with the teachings disclosed in commonly-owned U.S. patent application Ser. No. 16/012,399 (Higgins et al.), filed on Jun. 19, 2018 and entitled PORTABLE CHARGING UNIT WITH ACCELERATED CHARGING FOR HEARING ASSISTANCE DEVICES, which is incorporated herein by reference.

Figure 16:
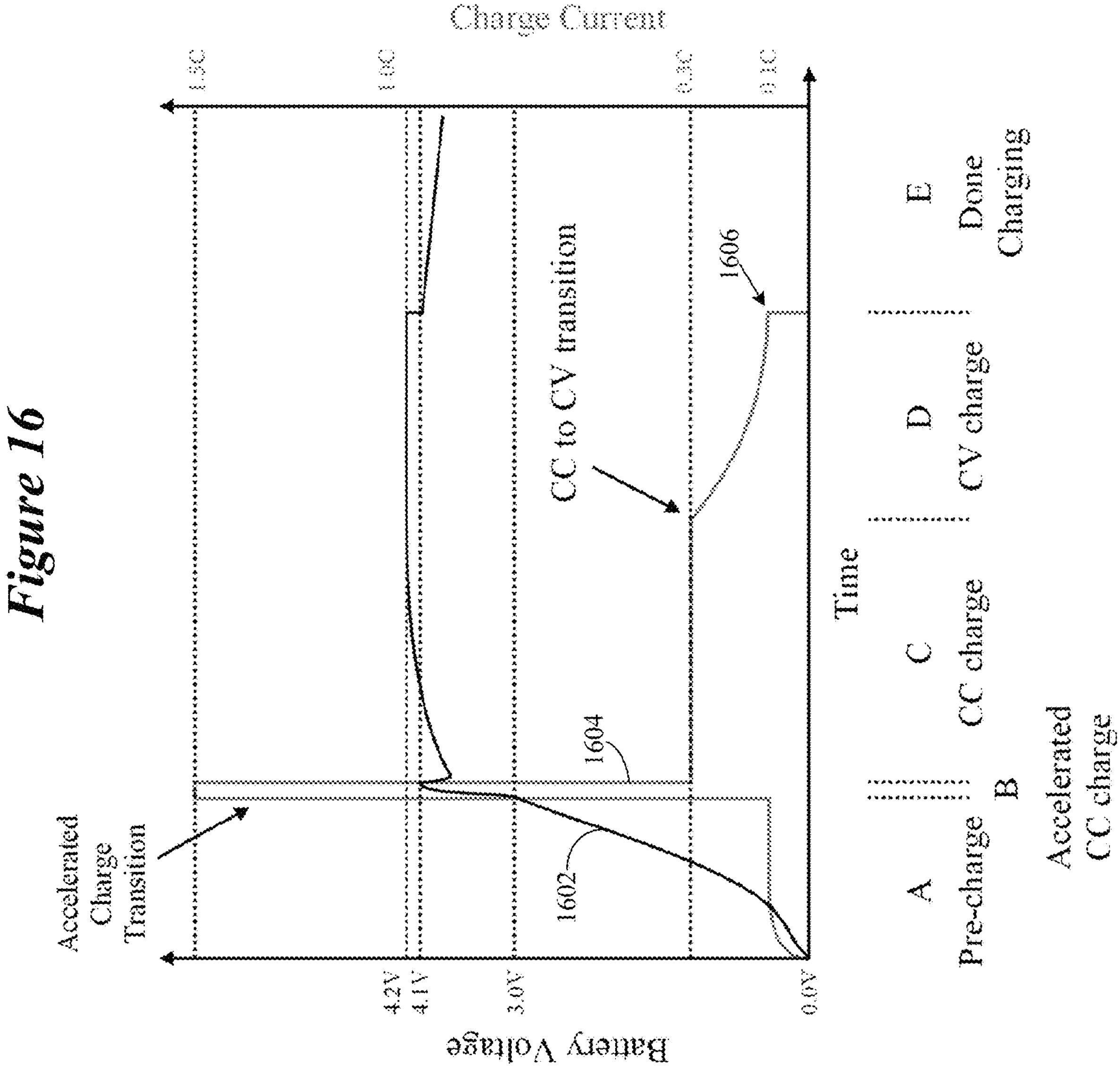
FIG. 16 is a graph that characterizes accelerated charging of a lithium-ion battery of a hearing device in accordance with any of the embodiments disclosed herein.

FIG. 16 is a graph that characterizes accelerated charging of a lithium-ion battery of an ear-worn electronic device in accordance with any of the embodiments disclosed herein. The graph of FIG. 16 characterizes battery voltage 1602 and charge current 1604 as a function of time during different phases of a charging procedure. As is indicated below the time axis, the different phases of the charging procedure include a pre-charge phase (A), an accelerated constant current charge phase (B), a constant voltage charge phase (D), and a charge complete phase (E). During the pre-charge phase (A), the charge current 1604 is low (e.g., 0.1C) and the battery voltage 1602 slowly increases. It is noted that a well-designed system should stay out of this regime. The pre-charge phase (A) continues until the battery voltage 1602 reaches 3.0 V, at which time the accelerated constant current charge phase (B) is initiated.

During the accelerated charging phase (B), the charge current 1604 rapidly increases to a charge rate above 1.0C, such as 1.5C. During the accelerated charging phase (B), high current is supplied to the battery which results in a rapid increase in battery voltage 1602. For example, a charge current of 5 mA can be supplied to the battery during the latter part of the pre-charge phase (A) (e.g., at 0.3C). The charge current can be increased to between 17 and 24 mA during the accelerated charging phase (B). The accelerated charging phase (B) continues until a predetermined time limit (e.g., 5-15 min) has been reached. In some embodiments, the accelerated charging phase (B) continues until a predetermined battery voltage 1602 (e.g., 4.1 V) or predetermined energy level (e.g., 7.5 mAh) has been reached.

At the conclusion of the accelerated charging phase (B), the charge current 1604 rapidly decreases to a normal charge current level (e.g., 5 mA at a charge rate of 0.3C) at the initiation of the constant current charge phase (C). During the constant current charge phase (C), a normal charge current (e.g., 5 mA) is supplied to the battery resulting in a continued increase in the battery voltage 1602. When the battery voltage 1602 reaches a predetermined level (e.g., 4.2 V), the charging procedure transitions from the constant current charge phase (C) to the constant voltage charge phase (D). During the constant voltage charge phase (D), the charge current 1604 decreases until a cutoff 1606 is reached, at which time the charging procedure is terminated. It is noted that at the charging complete phase (E), the battery voltage 1602 slightly drops over time (e.g., from 4.1 V to 3.9 V). In the embodiment shown in the FIG. 16, the charge current 1604 supplied during the accelerated charging phase (B) changes in a step-wise fashion. It is understood that, in some embodiments, the charge current 1604 can decrease gradually as the accelerated charging phase (B) transitions to the constant current charge phase (C).

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A hearing device comprising:

a housing that encloses an internal volume and extends from an internal side to an external side, the housing comprising:

a shell arranged at the internal side, the internal side configured to be inserted in a wearer's ear canal; and a faceplate arranged at the external side, the external side configured to face away from the wearer;

an electrode arrangement disposed in an outer surface of the faceplate, the electrode arrangement comprising:

a central contact; and at least one arcuate contact that extends around at least a portion of the central contact; and circuitry disposed in the internal volume and coupled to the electrode arrangement.

2. The hearing device of claim 1, wherein the at least one arcuate contact comprises an annular contact.

3. The hearing device of claim 1, wherein the at least one arcuate contact comprises a plurality of arcuate contacts.

4. The hearing device of claim 3, wherein the plurality of arcuate contacts has a concentric tri-trace configuration.

5. The hearing device of claim 3, wherein each of the plurality of arcuate contacts is arranged the same distance from the central contact as each other contact of the plurality of arcuate contacts.

6. The hearing device of claim 3, wherein the plurality of arcuate contacts defines a circle.

7. The hearing device of claim 1, further comprising:

one or more microphone ports disposed in the outer surface of the faceplate; and a receiver outlet disposed in the shell.

8. The hearing device of claim 1, wherein the central contact comprises an annular shape, wherein the at least one arcuate contact comprises a plurality of arcuate contacts each arranged at substantially the same distance from the central contact.

9. The hearing device of claim 1, wherein the central contact comprises an annular shape, wherein the at least one arcuate contact comprises three arcuate contacts each arranged at substantially the same distance from the central contact.

10. The hearing device of claim 1, wherein the central contact defines a cathode contact and the at least one arcuate contact defines an anode contact.

11. The hearing device of claim 1, wherein the at least one arcuate contact comprises a plurality of arcuate contacts, wherein a first arcuate contact of the plurality of arcuate contacts defines a cathode contact and a second arcuate contact of the plurality of arcuate contacts defines an anode contact.

12. The hearing device of claim 1, wherein the circuitry comprises charging circuitry, and wherein the electrode arrangement is coupled to the charging circuitry.

13. The hearing device of claim 1, wherein the at least one arcuate contact is configured to communicate power and one or more information signals.

14. A system comprising:

a hearing device comprising:

a housing that encloses an internal volume and extends from an internal side to an external side, the housing comprising:

a shell arranged at the internal side, the internal side configured to be inserted in a wearer's ear canal; and a faceplate arranged at the external side, the external side configured to face away from the wearer;

an electrode arrangement disposed in an outer surface of the faceplate, the electrode arrangement comprising:

a central contact; and at least one arcuate contact that extends around at least a portion of the central contact; and circuitry disposed in the internal volume and coupled to the electrode arrangement; and a charging module comprising a charging interface that comprises:

a central charging contact; and an annular ring charging contact or a plurality of charging contacts equidistant to the central contact.

15. The system of claim 14, wherein the at least one arcuate contact of the electrode arrangement of the hearing device comprises an annular contact.

16. The system of claim 14, wherein the at least one arcuate contact of the electrode arrangement of the hearing device comprises a plurality of arcuate contacts.

17. The system of claim 16, wherein the plurality of arcuate contacts defines a circle.

18. The system of claim 14, wherein the central contact of the electrode arrangement of the hearing device comprises an annular shape, wherein the at least one arcuate contact of the electrode arrangement of the hearing device comprises a plurality of arcuate contacts each arranged at substantially the same distance from the central contact.

19. The system of claim 14, wherein the central contact of the electrode arrangement of the hearing device comprises an annular shape, wherein the at least one arcuate contact comprises three arcuate contacts each arranged at substantially the same distance from the central contact.

20. The system of claim 14, wherein the hearing device comprises a first charging interface comprising the electrode arrangement, wherein the circuitry of the hearing device comprises charging circuitry coupled to the electrode arrangement, wherein the charging interface of the charging module defines a second charging interface configured to detachably couple with the first charging interface of the hearing device;

wherein the charging module further comprises charging circuitry coupled to the second charging interface and configured to charge a rechargeable power source of the hearing device that is coupled to the first charging interface.

21. The system of claim 14, wherein the hearing device further comprises:

one or more microphone ports disposed in the outer surface of the faceplate; and a receiver outlet disposed in the shell.

* * * * *